(12) United States Patent
Kim et al.

(10) Patent No.: US 12,647,946 B2
(45) Date of Patent: Jun. 2, 2026

(54) METHOD AND APPARATUS FOR SUBBAND DUPLEX OPERATION

(71) Applicant: ELECTRONICS AND TELECOMMUNICATIONS RESEARCH INSTITUTE, Daejeon (KR)

(72) Inventors: Cheul Soon Kim, Daejeon (KR); Jae Heung Kim, Daejeon (KR); Sung Hyun Moon, Daejeon (KR); Jung Hoon Lee, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 433 days.

(21) Appl. No.: 17/851,291

(22) Filed: Jun. 28, 2022

(65) Prior Publication Data

US 2023/0007641 A1     Jan. 5, 2023

(30) Foreign Application Priority Data

| | | |
|---|---|---|
| Jun. 30, 2021 | (KR) | 10-2021-0086140 |
| Mar. 24, 2022 | (KR) | 10-2022-0036864 |
| Apr. 22, 2022 | (KR) | 10-2022-0050276 |
| Apr. 27, 2022 | (KR) | 10-2022-0051990 |
| May 20, 2022 | (KR) | 10-2022-0062127 |
| Jun. 3, 2022 | (KR) | 10-2022-0068272 |
| Jun. 13, 2022 | (KR) | 10-2022-0071501 |

(51) Int. Cl.
*H04W 72/044* (2023.01)
*H04L 5/14* (2006.01)

(52) U.S. Cl.
CPC ............. *H04W 72/044* (2013.01); *H04L 5/14* (2013.01)

(58) Field of Classification Search
None
See application file for complete search history.

(56) References Cited

U.S. PATENT DOCUMENTS

| | | | |
|---|---|---|---|
| 8,542,639 B2 | 9/2013 | Kwak et al. | |
| 2006/0077931 A1 | 4/2006 | Lee et al. | |
| 2019/0230580 A1 | 7/2019 | Kim et al. | |
| 2019/0357224 A1* | 11/2019 | Li | H04L 5/0007 |
| 2021/0092717 A1* | 3/2021 | Takeda | H04W 72/04 |
| 2021/0135833 A1 | 5/2021 | Hao et al. | |
| 2021/0136697 A1 | 5/2021 | Fu et al. | |
| 2021/0160903 A1 | 5/2021 | Kim et al. | |
| 2021/0273774 A1 | 9/2021 | Abotabl et al. | |
| 2021/0288852 A1* | 9/2021 | Jia | H04W 72/0453 |
| 2021/0307010 A1 | 9/2021 | Abotabl et al. | |

(Continued)

FOREIGN PATENT DOCUMENTS

EP          1819063 A1     8/2007

*Primary Examiner* — Lonnie V Sweet
(74) *Attorney, Agent, or Firm* — LRK PATENT LAW FIRM

(57) ABSTRACT

A subband duplex (SD) operation method of a terminal may include: receiving, from a base station, slot pattern information for a slot; receiving, from the base station, information on at least one subband; and performing uplink transmission and/or downlink reception with the base station in the at least one subband included in at least one SD symbol included in the slot.

15 Claims, 13 Drawing Sheets

(56)         References Cited

U.S. PATENT DOCUMENTS

| | | | | |
|---|---|---|---|---|
| 2022/0039158 A1* | 2/2022 | Awadin | ................ | H04W 72/23 |
| 2022/0295513 A1* | 9/2022 | Abotabl | ............... | H04W 72/23 |
| 2022/0417916 A1* | 12/2022 | Kim | ................ | H04W 72/0453 |
| 2023/0083914 A1* | 3/2023 | Nammi | .................... | H04L 5/16 |
| | | | | 370/329 |
| 2023/0328704 A1* | 10/2023 | Oh | ..................... | H04W 72/232 |
| | | | | 370/329 |

* cited by examiner

FIG. 10

PUSCH of a hop

Unavailable resources due to
duplex gap or guard time, etc

Transmitted PUSCH
with rate matching

Valid RBs but not
transmitted resources freq time

Valid RBs but not
transmitted resources

Unavailable resources due to
duplex gap or guard time, etc

Transmitted PUSCH
with rate matching

PUSCH of a hop freq time

METHOD AND APPARATUS FOR SUBBAND DUPLEX OPERATION

CROSS-REFERENCE TO RELATED APPLICATIONS

This application claims priority to Korean Patent Applications No. 10-2021-0086140 filed on Jun. 30, 2021, No. 10-2022-0036864 filed on Mar. 24, 2022, No. 10-2022-0050276 filed on Apr. 22, 2022, No. 10-2022-0051990 filed on Apr. 27, 2022, No. 10-2022-0062127 filed on May 20, 2022, No. 10-2022-0068272 filed on Jun. 3, 2022, and No. 10-2022-0071501 filed on Jun. 13, 2022 with the Korean Intellectual Property Office (KIPO), the entire contents of which are hereby incorporated by reference.

BACKGROUND

1. Technical Field

The present disclosure relates to communication methods and apparatuses for a subband duplex operation in a mobile communication system.

2. Description of Related Art

As scenarios to which mobile communication is applied, enhanced mobile broadband (eMBB), massive machine-type communication (mMTC), and Ultra-Reliable and Low-Latency communication (URLLC) may be considered. In addition, a time sensitive communication (TSC) scenario may be further considered. In particular, the mMTC, URLLC, and TSC may be applied in Internet of things (IoT) scenarios. In one network, all or some of the above-described scenarios should be supported. For example, the mMTC scenario may be determined as satisfying the IMT-2020 requirements using narrow band (NB)-IoT and LTE-MTC techniques, but a lot of discussion is needed to satisfy the URLLC scenario.

SUMMARY

Accordingly, exemplary embodiments of the present disclosure are directed to providing operation methods of a terminal and a base station for subband duplex operations.

Accordingly, exemplary embodiments of the present disclosure are directed to providing configurations of a terminal and a base station for subband duplex operations.

According to a first exemplary embodiment of the present disclosure, a subband duplex (SD) operation method of a terminal may comprise: receiving, from a base station, slot pattern information for a slot; receiving, from the base station, information on at least one subband; and performing uplink transmission and/or downlink reception with the base station in the at least one subband included in at least one SD symbol included in the slot.

The slot pattern information may be received by radio resource control (RRC) signaling or a combination of RRC signaling and downlink control information (DCI).

The at least one SD symbol may be consecutive flexible (FL) symbols located between a downlink (DL) symbol and an uplink (UL) symbol within the slot.

The at least one SD symbol may be configured, as consecutive symbols located between a DL symbol and a UL symbol within the slot, as (at least one DL symbol and at least one FL symbol) or (at least one FL symbol and at least one UL symbol).

The information on the at least one subband may be received through at least one of a group common DCI, UE-specific DCI, RRC signaling, or combinations thereof.

The information on the at least one subband may be limitedly applied to the at least one SD symbol.

The SD operation method may further comprise receiving, from the base station, information on a first symbol set and a second symbol set of the slot, wherein the information on the at least one subband includes information on a first subband and a second subband, the first subband is applied to the first symbol set, and the second subband is applied to the second symbol set.

The terminal may perform DL reception in the first subband and performs UL transmission in the second subband.

A guard band may exist between the first subband and the second subband.

The information on the at least one subband may include information on a resource block (RB) set corresponding to each of the at least one subband.

The RB set may be indicated by a starting RB index and an ending RB index, or indicated by a starting RB index and a number of RBs constituting the RB set.

The receiving of the information on the at least one subband may comprise: receiving, from the base station, information on a plurality of subbands through RRC signaling; and receiving a media access control (MAC) control element (CE) for activating the at least one subband among the plurality of subbands.

According to a second exemplary embodiment of the present disclosure, a subband duplex (SD) operation method of a base station may comprise: transmitting, to a terminal, slot pattern information for a slot; transmitting, to the terminal, information on at least one subband; and performing uplink reception and/or downlink transmission with the terminal in the at least one subband included in at least one SD symbol included in the slot.

The at least one SD symbol may be consecutive flexible (FL) symbols located between a downlink (DL) symbol and an uplink (UL) symbol within the slot.

The at least one SD symbol may be configured, as consecutive symbols located between a DL symbol and a UL symbol within the slot, as (at least one DL symbol and at least one FL symbol) or (at least one FL symbol and at least one UL symbol).

The SD operation method may further comprise transmitting, to the terminal, information on a first symbol set and a second symbol set of the slot, wherein the information on the at least one subband includes information on a first subband and a second subband, the first subband is applied to the first symbol set, and the second subband is applied to the second symbol set.

The base station may perform DL transmission in the first subband and performs UL reception in the second subband.

According to a third exemplary embodiment of the present disclosure, a subband duplex (SD) operation method of a terminal may comprise: receiving, from a base station, configuration information for a control resource set (CORESET); determining whether at least part of the CORESET is unavailable; and in response to determining that at least part of the CORESET is unavailable, monitoring downlink control channels in valid resource element group (REG) bundle(s) under assumption that control channel element(s) CCE(s) are mapped only to the valid REG bundle(s) belonging to the CORESET.

The at least part of the CORESET may be resource element(s) (RE(s)) in which a downlink (DL) reception operation of the terminal is impossible due to a duplex gap or guard time according to subband duplex operations.

The valid REG bundle(s) is a REG bundle(s) that does not include the RE(s) in which the DL reception operation of the terminal is impossible.

According to the exemplary embodiments of the present disclosure, processing methods of a mobile communication system for subband duplex operations can be provided. Accordingly, the efficiency of radio resource use of the communication system can be increased, and the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which:

FIGS. 8 to 10 are conceptual diagrams illustrating cases in which some resources of a CORESET are not received.

DETAILED DESCRIPTION OF THE EMBODIMENTS

Figure 1:
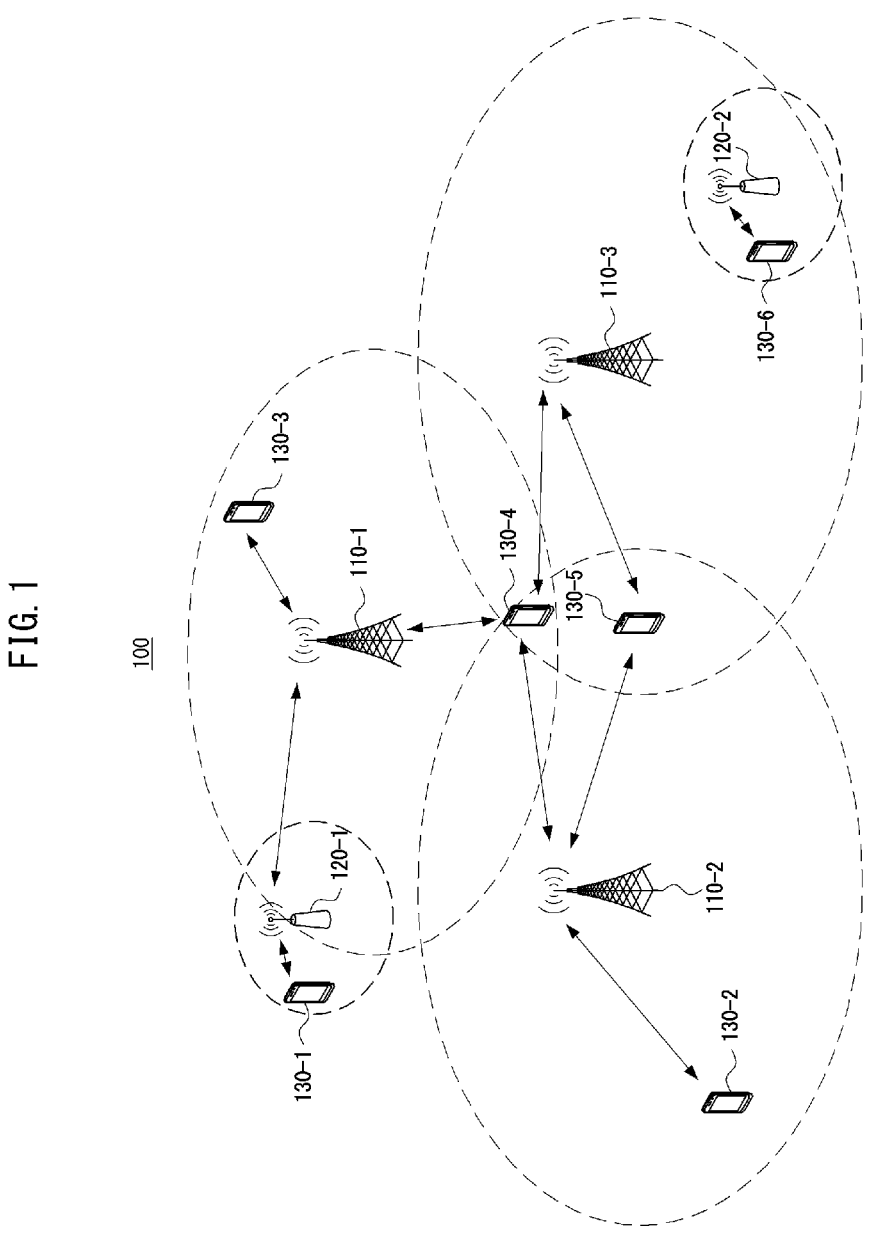
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. 'Configuration of a resource (e.g., resource region)' may mean that configuration information of the corresponding resource is signaled. The signaling may be performed based on at least one of system information (SI) signaling (e.g., transmission of system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may mean an apparatus or a device. Exemplary embodiments may be performed by an apparatus or device. A structure of the apparatus (or, device) may be as follows.

Figure 2:
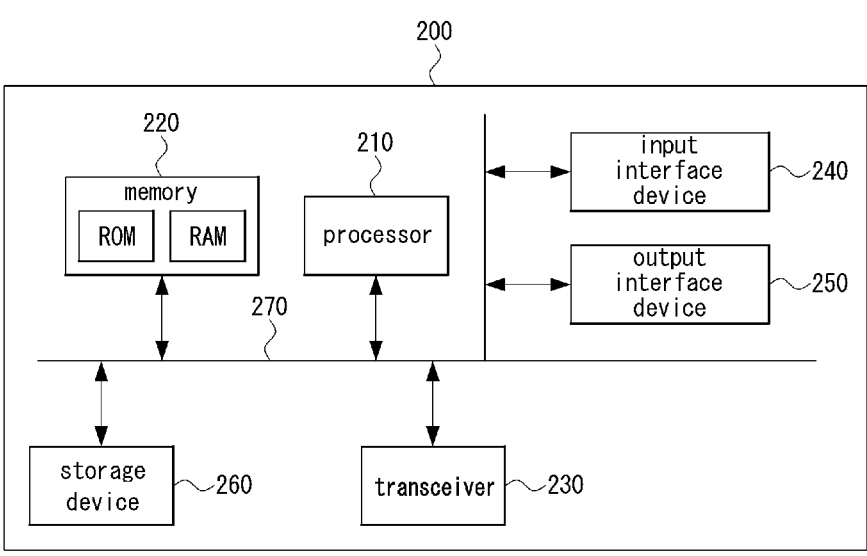
FIG. 2 is a block diagram illustrating a first exemplary embodiment of an apparatus.

FIG. 2 is a block diagram illustrating a first exemplary embodiment of an apparatus.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

As scenarios to which mobile communication is applied, enhanced mobile broadband (eMBB), massive machine-type communication (mMTC), and Ultra-Reliable and Low-Latency communication (URLLC) may be considered. In addition, a time sensitive communication (TSC) scenario may be further considered. In particular, the mMTC, URLLC, and TSC may be applied in Internet of things (IoT) scenarios. In one network, all or some of the above-described scenarios should be supported. The mMTC scenario may be determined as satisfying the IMT-2020 requirements using narrow band (NB)-IoT and LTE-MTC techniques, but a lot of discussion is needed to satisfy the URLLC scenario.

In order to reduce an error rate of data, a low modulation and coding scheme (MCS) may be applied. However, in order not to increase a size of a field indicating an MCS in downlink control information (DCI), an MCS table may be configured using frequently used MCSs instead of using all possible MCSs. In order to apply a lower MCS than the MCSs supported by the MCS table, repeated transmission may be supported. In case of applying a QPSK which is the lowest modulation rate, the effect of further reducing the code rate can be achieved. In particular, since a transmission power is limited in case of uplink, repetition in the time domain may be used rather than repetition in the frequency domain.

In case of eMBB traffic and URLLC traffic supported by the 5G system, a lower MCS may be required for different purposes, respectively. For example, for eMBB traffic, a lower MCS may be required to extend a coverage. On the other hand, for URLLC traffic, a lower MCS may be required to reduce a latency and achieve a lower error rate. Since the requirements are different, in case of eMBB traffic, repeated transmission may be utilized even with a relatively large latency. On the other hand, in case of URLLC traffic, new MCSs may be introduced and applied to DCI/RRC rather than repeated transmission.

In order to support repeated transmission in the time domain for eMBB traffic, PUSCH repetition (or PUSCH repetition type A) has been introduced. In the PUSCH repetition type A, a PUSCH (or PUSCH mapping type A) allocated on a slot basis may be repeatedly transmitted. The PUSCH repetition type A corresponds to a configuration using time resource allocation over several slots in order to enhance the coverage. A DCI (e.g., in case of a type 2 configured grant and a dynamic grant) or RRC signaling (in case of a type 1 configured grant) may indicate only a time resource used for transmission in a first slot, and RRC signaling may indicate the number of repeated transmissions, so that time resources used for the PUSCH repetition type A are determined.

In order to support the URLLC traffic, it is preferable that the terminal performs a reception operation more frequently using downlink (DL) resources and a transmission operation more frequently using uplink (UL) resources. In a time division duplex (TDD) system, since the terminal operates in a half-duplex scheme, a large latency may occur to support DL traffics and UL traffics according to a configured slot pattern (i.e., UL/DL pattern). On the other hand, in a frequency division duplex (FDD) system, since the terminal can use DL resources and UL resources at the same time, the above-described problem of latency may not occur. The FDD system uses two carriers. Even in the case of the TDD system, if two or more serving cells are configured for the terminal, the terminal may use DL resources and UL resources at the same time. For example, in a system including at least one carrier operating in the FDD scheme, the terminal may not have a disadvantage in the latency. For example, in a system configured only with carriers operating in the TDD scheme, a disadvantage in the latency may occur to the terminal. To solve this problem, slots may be configured with different patterns in the carriers operating in the TDD scheme.

Carrier aggregation (CA) may be configured for the terminal, and a PCell and at least one SCell may be activated. The PCell may be distinguished from the SCell in that at least one common search space (CSS) set is included in the PCell. Here, in order to reduce a latency when supporting the URLLC traffics, slots having different patterns may be configured and indicated to the terminal.

Subband Duplex Operations

1 Method of Interpreting a Duplex Direction in a Subband

In the TDD system, a slot pattern may be configured to the terminal through RRC signaling. By receiving an additional DCI (e.g., DCI format 2_0), DL reception or UL transmission may be performed in symbol(s) configured as flexible (FL) symbol(s) within a slot by RRC signaling. The operations of the terminal according to the conventional technical specification may be exemplified in Table 1.

An index included in the DCI format 2_0 should indicate a DL symbol configured to the terminal through RRC signaling as the DL symbol. Similarly, an index included in the DCI format 2_0 should indicate a UL symbol configured to the terminal through RRC signaling as the UL symbol. However, in a FL symbol configured to the terminal through RRC signaling, reception of a DL signal and/or channel or transmission of a UL signal and/or channel may be allowed according to an index included in the DCI format 2_0. Here, the terminal should consider only a DL signal and/or channel and/or a UL signal and/or channel allocated by a scheduling DCI. Table 1 below relates to transmission and reception interpretation methods when the terminal is configured to receive the DCI format 2_0.

TABLE 1

|  | Semi-static DL | Semi-static UL | Semi-static FL |
|---|---|---|---|
| Dynamic DL | DCI based DL reception Configured DL reception | N/A | DCI based DL reception |
| Dynamic UL | N/A | DCI based UL transmission Configured UL transmission | DCI based UL transmission |
| Dynamic FL | N/A | N/A | Configured PRS |

Additionally, if a DCI is not received, the terminal may assume only DL/FL/UL configured through RRC signaling. Accordingly, reception of a DL signal and/or channel may not be allowed in a FL symbol, and transmission of a UL signal and/or channel may not be allowed in a FL symbol.

An uplink coverage may be limited while the terminal operates in a full-duplex scheme or a half-duplex scheme. In this case, it may be preferable that more FL symbols can be utilized as UL symbols. In a specific slot composed of DL symbol(s), FL symbol(s), and UL symbol(s), a system in which specific subcarrier(s) of the FL symbol(s) may be utilized for downlink and other specific subcarrier(s) may be utilized for uplink is considered.

Consider a case where there are two or more consecutive FL symbols within a slot. This is because there may be no symbol corresponding to a guard time if both DL reception and UL transmission are performed in one FL symbol. In an example, FL symbols may be configured in the order of (subcarrier(s) for performing DL reception (i.e., DL subcarrier(s)) and FL subcarrier(s)), (DL subcarrier(s), FL subcarrier(s), and subcarrier(s) for performing UL transmission (i.e., UL subcarrier(s))), or (FL subcarriers and UL subcarriers). In another example, some of the FL symbols may be used not only for DL reception but also for UL transmission, and may be configured with DL subcarrier(s), FL subcarrier(s), and UL subcarrier(s).

1.1 Method Using Enhanced SFI

Considering specific FL symbols, guard subcarrier(s) (or guard tone(s)) may be required between DL reception and UL transmission. Therefore, it may be preferable in terms of transmission efficiency to reduce the number of guard subcarrier(s). For this, it may be preferable that the number of boundaries at which DL and UL are switched is small. If both DL reception and UL transmission are allowed in FL symbol(s), the UL transmission may be preferably performed in subcarriers having a lower frequency so that a reception SINR of a UL signal/channel increases at the base station.

Figure 3:
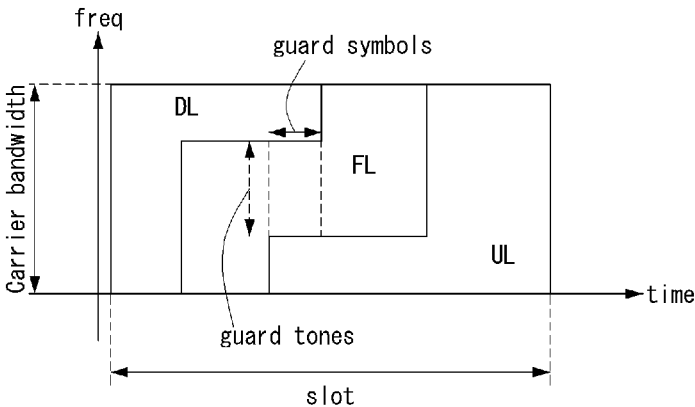
FIG. 3 is a conceptual diagram illustrating an exemplary embodiment of a configuration of resource allocation in which DL transmission and UL reception can be performed in a specific slot.

FIG. 3 is a conceptual diagram illustrating an exemplary embodiment of a configuration of resource allocation in which DL transmission and UL reception can be performed in a specific slot.

Referring to FIG. 3, FL symbols may be consecutively located, and the FL symbols may be located between DL symbol(s) and UL symbol(s). A region in which a UL signal/channel can be transmitted may be allocated to a lower frequency, and a region in which a DL signal/channel can be received may be allocated to a higher frequency. Here, since the terminal may operate in the half-duplex scheme, it may not transmit a UL signal/channel while receiving a DL signal/channel.

Figure 4:
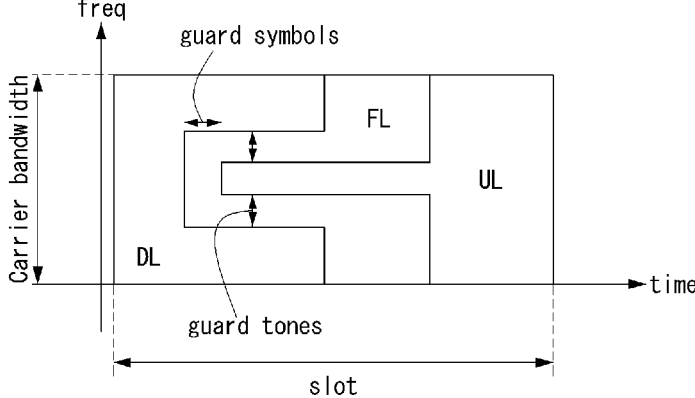
FIG. 4 is a conceptual diagram illustrating another exemplary embodiment of a configuration of resource allocation in which DL transmission and UL reception can be performed in a specific slot.

FIG. 4 is a conceptual diagram illustrating another exemplary embodiment of a configuration of resource allocation in which DL transmission and UL reception can be performed in a specific slot.

Referring to FIG. 4, a UL signal/channel may be allocated to be transmitted in some subcarriers of symbols in which a DL signal/channel can be received. Therefore, a frequency region in which the UL signal/channel is transmitted may divide a frequency region in which the DL signal/channel is received into two or more parts. In this case, in order to reduce an interference (i.e., adjacent channel leakage ratio (ACLR), etc.) that the terminal's UL transmission has on adjacent bands, the frequency region in which the UL signal/channel is transmitted may not be located at an edge of a carrier.

FL symbols and/or UL symbols may be referred to as non-DL symbols (or, subband duplex (SD) symbols or subband full duplex (SBFD) symbols). In an exemplary embodiment, the SD symbol may mean only an FL symbol or an FL symbol and a UL symbol.

Alternatively, FL symbols and/or DL symbols may be referred to as non-UL symbols (or SD symbols or SBFD symbols). In another exemplary embodiment, the SD symbols may include some symbols of DL symbols, and in this case, they may mean DL symbols, FL symbols, or UL symbols.

A DL/UL pattern may be applied to subcarriers belonging to SD symbols whose duplex may vary for each subband. The base station may configure this pattern to terminals by RRC signaling or may indicate it to them by using a DCI. For convenience of description, this DCI may be referred to as a DCI format x.

In a proposed method, the SD symbol may be a symbol that is not indicated as a DL symbol by a common slot pattern. A SD symbol of one terminal may be indicated to another terminal as a DL symbol, FL symbol, UL symbol, or SD symbol according to a slot pattern for each terminal. By RRC signaling, the terminal may know in which region (i.e., REs) DL reception is allowed or UL transmission is allowed in a DL BWP and UL BWP configured to the terminal.

Method 1-1: BWP configuration may include information on a DL region and a UL region that can be allowed in SD symbols in the frequency domain.

The base station may determine which subcarriers of SD symbols to be placed in the DL region or the UL region according to a traffic condition or a position of the terminal. This may be indicated to the terminal by a DCI. The base station may indicate it to the terminal by using a group common DCI or UE-specific DCI. For example, the DCI format x may be the DCI format 2_0.

In another example, the DCI format x may be a DCI format 2_1 or DCI format 2_4. The DCI format 2_4 may be received by several terminals, and may indicate a pattern of resources in which UL transmission is allowed or not.

Method 1-2: The terminal may know a pattern (DL, FL, UL) for subcarriers of SD symbols by receiving a DCI.

In the DCI format x, a pattern of slots may be included as an index. More specifically, indexes to be interpreted by several terminals may be concatenated to form the DCI, and each index may be interpreted as a pattern of slots. Each terminal may be configured through RRC signaling to determine where information should be obtained from the DCI.

Method 1-3: For a given SD symbol, a pattern for subcarriers may be known by an index.

An index derived from a starting index of a PRB or CRB and the number of consecutive RBs may be given for each SD symbol. In this manner, since many indexes should be provided when the number of SD symbols is large, a signaling burden may be large. To solve this problem, a method of deriving a pattern for subcarriers from information having a fixed size may be considered.

Method 1-4: For a given SD symbol, a pattern for subcarriers may be known by a 2D bitmap.

The length of the 2D bitmap may be configured by RRC signaling to the terminal. One bit may correspond to a set of REs expressed by consecutive symbols and consecutive subcarriers. Here, one value of each bit of the bitmap means that the use for DL and UL in the set of REs corresponding to the bit is allowed, and another value thereof means that the use is not allowed.

Method 1-5: In Method 1-4, the total length of the 2D bitmap and the length of one axis thereof (i.e., the number of consecutive symbols or the number of consecutive subcarriers) may have independent values, and may be configured by RRC signaling to the terminal.

Figure 5:
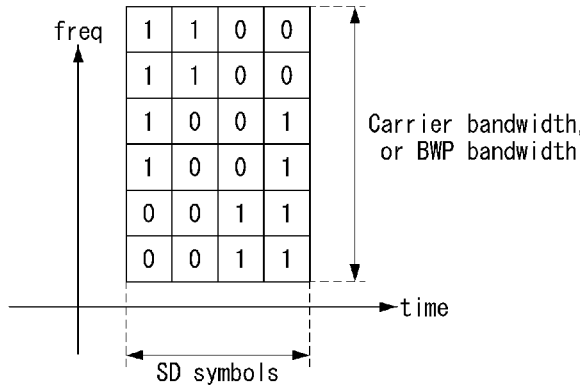
FIG. 5 is a conceptual diagram illustrating an exemplary embodiment in which characteristics of subcarriers are represented in a bitmap with respect to consecutive SD symbols.

FIG. 5 is a conceptual diagram illustrating an exemplary embodiment in which characteristics of subcarriers are represented in a bitmap with respect to consecutive SD symbols.

Referring to FIG. 5, one value (e.g., '1') set to each bit of the bitmap may indicate that utilization for DL and UL is allowed, and another value (e.g., '0') may indicate that utilization for DL and UL is not allowed. A region corresponding to the bit set to 1 may be interpreted as being utilized for UL transmission in a low-frequency region and may be interpreted as being utilized for DL reception in a high-frequency region. Conversely, 0 and 1 may be interpreted interchangeably, and DL and UL may be interpreted interchangeably.

The arrangement of 1's and 0's in a pattern of subcarriers at a given time (or SD symbols) may be limited. That is, the positions of 0's may be restricted to a configuration in which consecutive 1(s), consecutive 0(s), and consecutive 1(s) are arranged, a configuration in which consecutive 0(s) and consecutive 1(s) are arranged, or a configuration in which consecutive 1(s) and consecutive 0(s) are arranged in the order of increasing frequency at a given time. In addition, the positions of 0's may be restricted to a configuration in which consecutive 1(s), consecutive 0(s), and consecutive 1(s) are arranged, a configuration in which consecutive 0(s) and consecutive 1(s) are arranged, or a configuration in which consecutive 1(s) and consecutive 0(s) are arranged in the order of increasing time at a given frequency.

Accordingly, a temporal order of (DL, FL, and UL) may be satisfied at a given frequency, and at the same time, a frequency order of (DL, FL, and UL) (or UL, FL, and DL) may be satisfied at a given time. This may be summarized by Method 1-6. In addition, the positions of 0's expressed as FL may be arranged adjacent to each other in the time and frequency domains, and consecutive 0's may not be interrupted by being surrounded by 1's in the time or frequency domain.

Method 1-6: In Method 1-4, the method in which the values of the bitmap are arranged may satisfy a rule in which a pattern for a time at a given frequency and a pattern for a frequency at a given time are the same.

Method 1-7: In Method 1-6, time and frequency resources divided by FL may not be divided by resources divided by UL and DL.

Here, since numerologies of a DL BWP and a UL BWP may be different from each other, a reference numerology may be applied. Accordingly, the number of symbols and subcarriers corresponding to one bit may vary depending on when interpreted as DL or when interpreted as UL.

The above method may express the characteristics of subcarriers for consecutive FL symbols in one slot. When the DCI format x is used, since a pattern of several consecutive slots is derived from one index, the characteristics of the FL symbols may also be included for each slot.

The number (e.g., N) of slots may be configured to the terminal through RRC signaling, and a pattern for N slots may be derived by one index. For example, N may not be greater than maxNrofSlotFormatsPerCombination.

Alternatively, a periodicity at which the DCI format x is received by the terminal may be configured through RRC signaling, and an index derived from the DCI format x may be interpreted for SD symbols belonging to one period. For example, when the periodicity at which the DCI format x is received is y slots, SD symbols in z units may be distinguished. Here, one unit may mean consecutive FL symbols, and the value of z may be derived differently for each slot pattern. The terminal may apply the index derived from the DCI format x to SD symbols belonging to one unit. Accordingly, a size of a resource for which the index is interpreted (i.e., the number of symbols and/or the characteristics of subcarriers) may be different for each slot pattern.

In order to derive the characteristics of the SD symbols for the N slots, the DCI format x may include N 2D bitmaps that can be read by the terminal. Alternatively, the terminal may read one 2D bitmap from the DCI format x, so that the characteristics of all non-DL symbols may be equally applied in N slots.

Method 1-8: The terminal may derive one 2D bitmap from the DCI format x, and accordingly, the characteristics of the SD symbols may be equally applied to N slots.

The 2D bitmap may be expressed as a 1D bit stream according to a predetermined rule. This may be interpreted by one or several terminals. Alternatively, several 1D bit streams may be concatenated. There may be one or more terminal group(s) corresponding to one 2D bitmap or one 1D bit stream.

1.2 Method Using an RB Set

Since the DCI format x has a characteristic of being transmitted to several terminals in common, it may affect the average performance of the base station. In order to indicate a frequency resource structure of the SD symbol(s) to specific terminals that want to interpret the SD symbol(s), a method using RRC signaling may be considered.

Method 1-9: RB set(s) may be indicated to a terminal through RRC signaling, and the terminal may know PRB(s) to be interpreted as DL PRB(s) and UL PRB(s) for SD symbol(s) based on the RB set(s).

The DL PRB(s) may be composed only of subcarriers capable of receiving a DL signal/channel, and the UL PRB(s) may be composed only of subcarriers capable of transmitting a UL signal/channel. A DL signal/channel and a UL signal/channel may not be allocated to PRB(s) that do not belong thereto, and the corresponding PRB(s) may be used as guard subcarrier(s) (i.e., guard tone(s)). The RB set may be configured by only a reference numerology or may be configured for each subcarrier spacing (SC S), and may be determined by an index of a starting common resource block (CRB) calculated based on the point A and the number of consecutive CRBs.

That is, the RB set may be defined by a CRB grid.

An RB set may be indicated by one RB index and the number of RBs. The RB set may include both RB(s) to which data can be mapped and RBs to which data is not mapped (i.e., a guard band or a gap).

Figure 6:
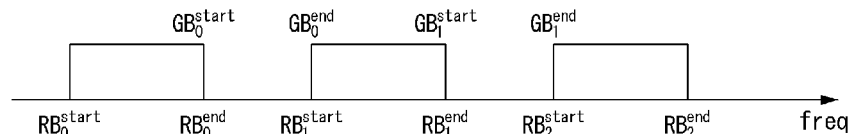
FIG. 6 is a conceptual diagram for describing an example in which characteristics of subcarriers are expressed using RB sets.

FIG. 6 is a conceptual diagram for describing an example in which characteristics of subcarriers are expressed using RB sets.

Referring to FIG. 6, $$RB_s^{end}$$

or $$GB_s^{end}$$

may be expressed only by an RB index, or may be derived from a value obtained by adding the RB index and the number of RBs. Here, s may be a natural number. For example, an RB set 0 may be expressed by

14

$$RB_0^{start}$$

and $$RB_0^{end},$$

and an RB set that is a gap may be expressed by $$GB_0^{start}$$

and $$GB_0^{end}.$$

An RB set 1 may be expressed by $$RB_1^{start}$$

and $$RB_1^{end},$$

and an RB set that is another gap may be expressed by $$GB_1^{start}$$

and $$GB_1^{end}.$$

An RB set 2 may be expressed by $$RB_2^{start}$$

and $$RB_2^{end}.$$

Here, $$RB_s^{end}$$

or $$GB_s^{end}$$

may be indicated for each subcarrier spacing or BWP.

The terminal may be indicated with an RB set interpreted as DL subcarriers in specific symbol(s). Similarly, the terminal may be indicated with an RB set interpreted as UL subcarriers in specific symbol(s). Specifically, the following methods may be considered.

Method 1-10: Symbols to which the terminal applies the RB set may be limited to SD symbols.

Method 1-11: A set of symbols to which an RB set for DL reception is applied may be indicated to the terminal by separate RRC signaling, or a set of symbols to which an RB set for UL transmission is applied may be indicated to the terminal by the RRC signaling.

Method 1-12: If separate RRC signaling is not indicated to the terminal, the terminal may apply the RB set for DL reception and the RB set for UL transmission to all symbols belonging to a slot.

Since the RB set is indicated to the terminal by RRC signaling, it may be difficult to flexibly apply the RB set. Accordingly, a plurality of RB sets may be configured to the terminal, and one RB set may be selected from among them. The base station may transmit MAC signaling indicating activation/deactivation of one RB set to the terminal. For example, the RB set may be indicated to the terminal using an index.

Method 1-13: Activation or deactivation of specific RB set(s) may be indicated to the terminal using a MAC CE.

Method 1-14: In Method 1-13, an RB set for DL reception and an RB set for UL transmission may be independently indicated to the terminal.

Method 1-15: In Method 1-13, when an RB set is indicated to the terminal, the terminal may derive an RB set for DL reception and an RB set for UL transmission from the indicated RB set.

When an RB set is indicated to the terminal, the terminal may apply the RB set with respect to a duplex direction of symbols indicated by an SFI received as a group common DCI.

1.3 Method Using a Rate Matching Resource (RMR)

In order to interpret a frequency resource of SD symbol(s), an indication method using a scheduling DCI may be considered. In the method of indicating a frequency resource of SD symbol(s) by using a group common DCI (e.g., DCI format x), a BLER may increase because the group common DCI having an increased size is received by terminals. However, if a scheduling DCI includes information on a frequency resource of SD symbol(s), there is an advantage in that only a terminal that receives a PDSCH or transmits a PUSCH in the SD symbol(s) receives the information on the frequency resource of the SD symbol(s).

Method 1-16: A time and frequency resource including SD symbol(s) may be expressed using a method of indicating a rate matching resource (RMR) by a scheduling DCI.

A field indicating application or non-application of an RMR may be included in a DCI format for scheduling a PDSCH, so that a position to which REs of the PDSCH are mapped may be indicated to the terminal. In addition, a field indicating application or non-application of an RMR may be included in a DCI format for scheduling a PUSCH, so that a position to which REs of the PUSCH are mapped may be indicated to the terminal.

The purpose of excluding data mapping to the RMR is to secure guard tones to suppress DL-UL interference, and to dynamically minimize DL-UL interference with neighboring base stations by using the scheduling DCI including the RMR.

In the existing technical specification, the RMR was used for the purpose of preventing a CORESET and a PDSCH from colliding with each other. According to the proposed method, since the RMR is used to indirectly indicate guard subcarriers, the size of the field indicating the RMR may increase. Alternatively, a separate field may be introduced in the scheduling DCI.

Method 1-17: When an RMR for indirectly indicating guard subcarriers is indicated by a scheduling DCI, the RMR may be indicated by increasing the size of the field indicating the RMR or introducing a separate field indicating the RMR.

When guard REs are derived from the indicated RMR, RE(s) to which data of the PDSCH or PUSCH is mapped and RE(s) to which data of the PDSCH or PUSCH is not mapped may be distinguished. In addition, in order to reduce DL-UL interference, filtering or power control may be required. An energy (or power or energy per resource element (EPRE)) allocated to the RE(s) to which data is mapped may not change. However, even if zero energy is allocated to the RE(s) to which data is not mapped, an energy transmitted or received by a sidelobe from adjacent REs may not be small, which may act as inter-carrier interference (ICI).

Therefore, the base station transmitting the PDSCH or the terminal transmitting the PUSCH may perform multi-carrier modulation (IDFT) after performing appropriate filtering in the frequency domain.

When the method of indicating the RB set (or guard band) to the terminal is applied, since RRC signaling is used, a time for applying or changing the position of the guard subcarrier(s) may increase. In addition, when RF filtering is performed in the guard band, a time may be required to change the RB set. For example, a time derived from a time required for BWP switching may be applied.

On the other hand, in the method of using an RMR for indirectly indicating the guard subcarriers, since only data mapping is restricted without performing RF filtering, a time for ensuring RF retuning is unnecessary. Using this advantage, the base station may be able to schedule a PDSCH in a period in which DL symbol(s) and SD symbol(s) are consecutive, or schedule a PUSCH in a period in which UL symbol(s) and SD symbol(s) are consecutive. If an RB set accompanied by RF filtering is indicated, it may be difficult to schedule a PDSCH (or PUSCH) in a period in which DL (or UL) symbol(s) and SD symbol(s) are consecutive, and a minimum interval between the DL (or UL) symbol(s) and the SD symbol(s) may have to be guaranteed.

Figure 7:
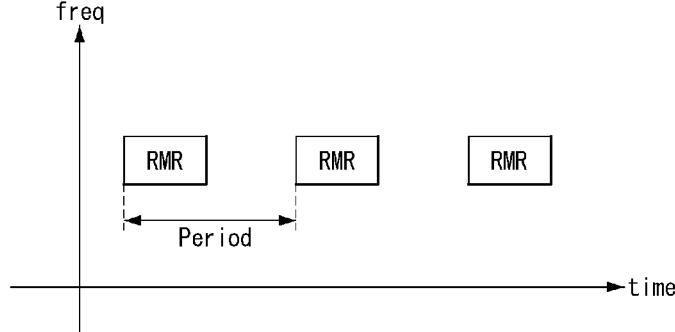
FIG. 7 is a conceptual diagram for describing an example in which characteristics of subcarriers are expressed using RMRs.

FIG. 7 is a conceptual diagram for describing an example in which characteristics of subcarriers are expressed using RMRs.

Referring to FIG. 7, an RMR may occur periodically, and whether the RMR is applied or ignored may be determined by a scheduling DCI. The terminal may receive the scheduling DCI, interpret bit(s) related to the RMR(s), and apply the RMR(s) according to values of the bit(s) to map a PDSCH (or PUSCH) to REs that do not belong to the RMR(s) or also to REs belonging to the RMR(s). As an example, an RMR group may be indicated to the terminal by RRC signaling, and the RMR group may indicate a part of the RMRs. A certain field of the scheduling DCI may correspond to the RMR group, and one bit of the certain field may determine whether to perform data mapping in consideration of RMR(s) belonging to the RMR group. The RMR may be given to the terminal through RRC signaling as a resource composed of RB(s) and symbol(s), a time resource in which the RMR occurs may be indicated to the terminal by RRC signaling as being expressed by one index, and a periodicity and a slot offset thereof may be derived from the index. Therefore, the RMRs may not always overlap in a time resource in which the PDSCH (or PUSCH) is scheduled, and the RMR group may not be reflected in data mapping according to the bit(s) indicated by the scheduling DCI.

The terminal may perform data mapping by considering the RMR group indicated to be reflected by the scheduling DCI as an activated RMR. The RMR group may correspond to a PDSCH or may correspond to a PUSCH. The RMR for a PDSCH and the RMR for a PUSCH may be indicated in different resource units. As an example, the RMR for a PDSCH may be expressed as a bitmap expressing RB(s) and symbol(s) with one bit, but the RMR for a PUSCH may be expressed not only as a bitmap expressing RB(s) and symbol(s) with one bit, but also as a bitmap expressing symbol(s) with one bit.

In this case, when the PUSCH is transmitted in the CP-OFDM scheme, it may be expressed as a bitmap expressing RB(s) and symbol(s) as a unit, and when the PUSCH is transmitted in the DFT-s-OFDM scheme, it may be expressed as a bitmap expressing symbol(s) as a unit. In this case, the terminal may be configured with a method of interpreting the RMR using the bitmap through RRC signaling.

Method 1-18: RMRs corresponding to DL and RMRs corresponding to UL may be independently indicated to the terminal.

The RMR (or RMR group) may be used to represent an RB set (or guard band). In this case, a bitmap expressing RB(s) and symbol(s) as a unit may be utilized, and the RB(s) and the symbol(s) may be interpreted using a subcarrier spacing derived from a reference numerology. In the RB set (or guard band), a PDSCH and PUSCH may not be mapped, and an RMR for the PDSCH and/or an RMR for the PUSCH should be able to be derived from one signaling. Since a DL BWP and a UL BWP may have different subcarrier spacings, the interpretation of the RMR for DL may be different from the interpretation of the RMR for UL.

Method 1-19: When RMRs are indicated to the terminal, the terminal may derive RMRs corresponding to DL and RMRs corresponding to UL from the indicated RMRs.

As an example, when the RMR (or RMR group) indicates an RB set (or guard band), the RMR (or RMR group) may not necessarily be indicated to the terminal only through a scheduling DCI, and may be received through a group common DCI. The group common DCI may have a separate format in order to indicate the RB set (or guard band) to the terminal(s), or may reuse a format supported in the conventional technical specification.

A plurality of candidate RMRs may be indicated to the terminal by RRC signaling, and one candidate RMR may be selected using a small number of bits of the scheduling DCI or group common DCI. In order for candidate RMR(s) to be properly indicated to the terminal according to traffic and scheduling or channel conditions with base stations, RRC signaling should be used, and thus a latency thereof may be long, and sufficiently flexible applications thereof may not be possible. Accordingly, the base station may transmit MAC signaling indicating activation/deactivation of the RMR(s) to the terminal so that several RMRs are configured for the terminal and some RMR(s) can be selected from among them. For example, the RMR(s) may be indicated to the terminal using index(es).

Method 1-20: Activation or deactivation of specific RMR(s) may be indicated to the terminal using a MAC CE.

2 PDCCH Reception

The terminal may detect PDCCH(s) by using a time resource indicated as a search space set and a frequency resource indicated as a CORESET. The time resource of the search space set configured to the terminal may be limited to DL symbols indicated by RRC signaling. When the full-duplex scheme is applied, the time resource of the search space set may be extended to DL resources indicated by RRC signaling to the terminal. Here, the DL resource may include RB(s) (or subband) capable of DL reception in SD symbols or SBFD symbols as well as DL symbols.

Method 2-1: A DL resource to which PDCCH candidates (or CCEs) can be mapped even in an SD symbol may be configured by RRC signaling or may be indicated by a DCI format.

Even if the time resource for the terminal to receive the search space set is extended to the DL resource configured (or indicated) to the terminal using RRC signaling or DCI format, the type of the corresponding search space set may be limited. That is, the type of the search space set received from the corresponding DL resource may be limited to only user-specific search space (USS) sets, or may be limited to USS sets and some types of common search space (CSS) sets. Alternatively, all types of search space sets may be received from the corresponding DL resource.

Method 2-2: In Method 2-1, when reception of some type of CSS sets is allowed in the DL resource configured (or indicated) to the terminal using RRC signaling or DCI format, reception of the Type-3 CSS set may be allowed in the DL resource configured (or indicated) to the terminal using RRC signaling or DCI format.

In the Type-0/0A/1/2 CSS sets, scheduling information for system information required when the terminal performs initial access, cell search, or camping may be received. Therefore, it is preferable that the Type-0/0A/1/2 CSS sets do not depend on a duplex direction of a slot and a subband. On the other hand, since the Type-3 CSS set can be observed only by some terminal(s) according to assigned RNTI(s), reception of the Type-3 CSS set may be allowed at least in the DL resource configured to the terminal using RRC signaling.

On the other hand, reception may not be possible in some resources of the SS set and the CORESET depending on the indicated duplex direction.

Figures 8, 9:
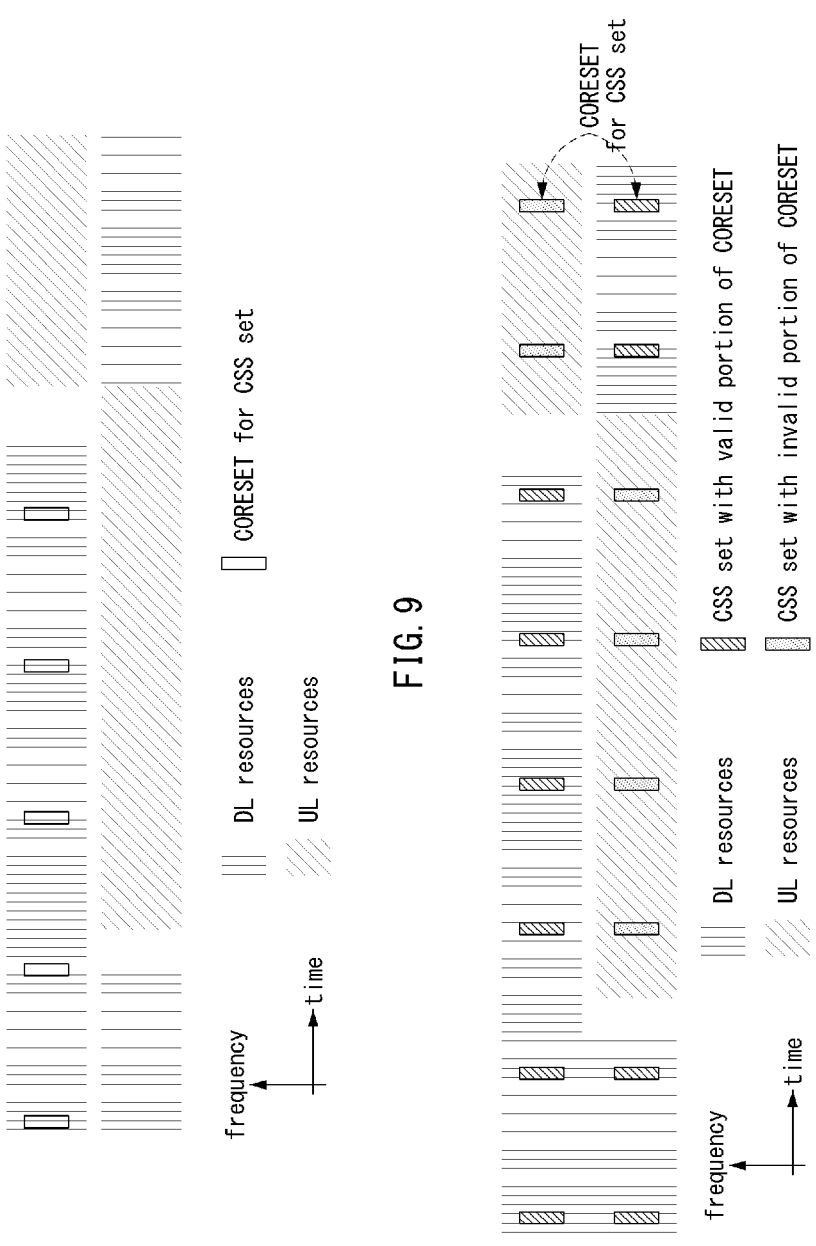
Figure 10:
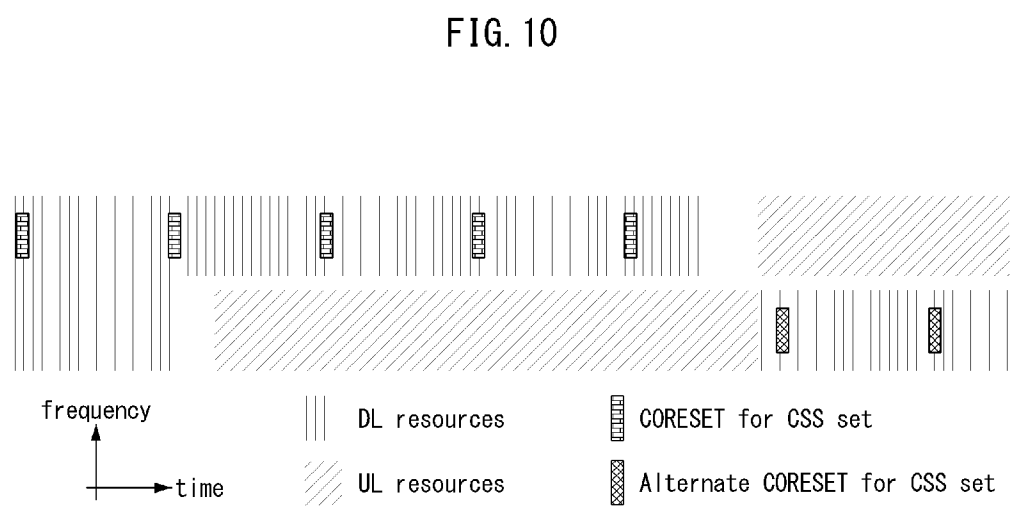

FIGS. 8 to 10 are conceptual diagrams illustrating cases in which some resources of a CORESET are not received. FIGS. 8 and 9 show a case in which one CORESET is associated with one CSS set, and FIG. 10 shows a case in which one or more CORESETs are associated with one CSS set.

Referring to FIG. 8, the terminal may receive a CSS set only in time resources capable of receiving CSS sets. According to the conventional technical specification, since a CSS set and a CORESET correspond to each other, a PDCCH candidate may be decoded by receiving the CORESET in symbol(s) where the CSS set is observed (i.e., when all subcarriers are a DL resource). When the CSS set and the CORESET associated therewith cannot be received by a duplex direction, the terminal may not observe the CSS set and the CORESET. This will be described in more detail in Method 2-9.

Referring to FIG. 9, a CSS set is associated with one CORESET and may be received from DL resources. One CORESET may be configured by collecting one or more consecutive frequency resources. With respect to the CSS set and the CORESET associated therewith, a PDCCH candidate can be decoded by observing the CSS set and the CORESET in a part of the CORESET that can be received according to a duplex direction. A method of interpreting the part of the CORESET that can be received will be described in more detail in Method 2-10.

Referring to FIG. 10, a CSS set may be associated with one or more ORESETs (CORESET 1 and CORESET 2 (i.e., alternate CORESET or alternative CORESET)). If the CORESET 1 can be received in a certain DL resource, the terminal may decode PDCCH candidates mapped to the CORESET 1 to observe the CSS set. If it is impossible to receive all or part of the CORESET 1 in the DL resource, the terminal may decode PDCCH candidates mapped to the CORESET 2 to observe the CSS set. Here, the CORESET 2 should be available for reception in the DL resource. By extending this method, it is also possible to sequentially change the CORESET associated with the CSS set. Several CORESETs may be associated with the CSS set, and they should be signaled to the terminal so that an order of these CORESETs can be derived.

Referring to FIGS. 8 to 10, with respect to the CSS set and CORESET, a processing method for SS set overbooking and REG bundle reception should be specified.

2.1 Method Supporting SS Set Overbooking

According to the conventional technical specification, a part of USS sets may be dropped in a serving cell when operating with only the serving cell, or in a PCell when operating through carrier aggregation.

The terminal may assume that all CSS sets are received, and the terminal may not receive some USS set(s) according to the number of PDCCHs and the number of CCEs that the terminal can receive (i.e., the number of PDCCH candidates for monitoring per span or per slot and the number of non-overlapped CCEs per span or per slot), which are detected by RRC signaling related to capability of the terminal.

When a coresetPoolIndex is configured, according to the conventional technical specification, the terminal may not receive a part of USS set associated with a CORESET (i.e., first CORESET) for which the coresetPoolIndex is 0. In other cases, the USS set(s) should be configured to the terminal so that the number of receivable PDCCHs and the number of receivable CCEs according to the capability of the terminal are not exceeded. The number of receivable PDCCHs and the number of receivable CCEs according to the capability of the terminal may be determined based on the capability of the terminal and a numerology of an active DL BWP.

In the system in which DL resources are changed according to a duplex direction, the number of PDCCHs and/or the number of CCEs that the terminal can receive may be reduced. In this case, the terminal may not receive a part of the configured SS set.

For example, a part of the SS set that the terminal cannot receive may be determined by the type of the corresponding SS set.

Method 2-3: A part of the Type-3 CSS set and a part of the USS set of the PCell may not be received.

Method 2-4: A part of the USS set of an SCell may not be received.

Method 2-5: In Method 2-3 and/or Method 2-4, a part of the SS set associated with the first CORESET or a part of the SS set associated with the first CORESET and the second CORESET may not be received.

When a CSS set is configured in the SCell, Method 2-3 may also be applied to the SCell. When a CSS set is configured in the PCell, it may be assumed that the terminal can always receive the Type-0/0A/1/2 CSS set. Since the Type-3 CSS set is identifiable by a RNTI, the terminal may apply a predetermined priority to the RNTI, receive only CSS sets associated with the RNTI corresponding to the high priority, and assume that CSS set(s) associated with the RNTI corresponding to the low priority are not received.

Alternatively, a part of a search space set may be identified by an identifier (ID).

Method 2-6: Parts of a search space set may be received in order of lower IDs assigned to the parts. That is, a part of the search space set, to which a low ID is assigned, may be preferentially received.

Method 2-7: In Method 2-6, a part of a search space set associated with the first CORESET or a part of the search space set associated with the first CORESET and the second CORESET may not be received.

When a part of the search space set is not received, it may be determined whether the part of the search space set is received or not with respect to the number $C^{total}$ of remaining CCEs and the number $M^{total}$ of remaining PDCCH candidates, excluding the number $M^{must}$ of CCEs and the number $C^{must}$ of PDCCH candidates allocated to the SS set that the terminal should receive.

2.2 Method Supporting REG Bundle and DM-RS

A frequency resource of one CORESET configured to the terminal may be non-consecutive. Consecutive RBs to which CCEs are mapped may constitute an RB set, and the CORESET may consist of two or more RB sets. Since duplex directions are different, two or more RB sets may be divided into RB set(s) in which a part of the CORESET is received and RB set(s) in which a part of the CORESET is not received.

Method 2-8: The terminal may assume that all RBs belonging to the CORESET can always be received.

When the base station determines a duplex gap and/or guard time, the base station may configure a frequency resource and/or time resource of the CORESET and the duplex gap and/or guard time so that the frequency resource and/or time resource of the CORESET and the duplex gap and/or guard time do not overlap with each other. In this case, Methods 2-8 may be applied. However, since there may occur a case where the base station does not satisfy the above condition, a method in which only a part of the CORESET can be received is required.

Method 2-9: When a part of the CORESET received by the terminal is unavailable REs, the terminal may not receive the entire CORESET.

Here, the unavailable REs mean REs in which a DL signal/channel cannot be received due to a duplex gap or guard time. The available REs mean REs in which a DL signal/channel can be received. In order to follow Method 2-9, it may be preferable that the base station configure th CORESET to the terminal so that unavailable REs do not occur in the CORESET.

When a part of the CORESET configured by the base station to the terminal is unavailable, some of REGs constituting a REG bundle may not be valid. Alternatively, some of REs constituting the REG bundle may not be valid. In this case, the terminal may utilize only valid REG(s) in one REG bundle. The reason is that if the REG is composed of only valid REs, the number of REs constituting the REG is reduced. This may affect a BLER performance according to DCI rate matching. Similarly, if the REG bundle is composed of only valid REGs, the number of REGs constituting the REG bundle is reduced, and a BLER performance according to DCI rate matching may be affected.

Since it is assumed that the same precoding is applied to REGs constituting one REG bundle, channel estimation may be performed using only a smaller number of REGs if invalid REGs are excluded from the REG bundle. Similarly, channel estimation may be performed using only a smaller number of REs if unavailable REs among REs constituting one REG are excluded from the REG. In addition, it may be necessary to change mapping of DM-RS.

Figure 11:
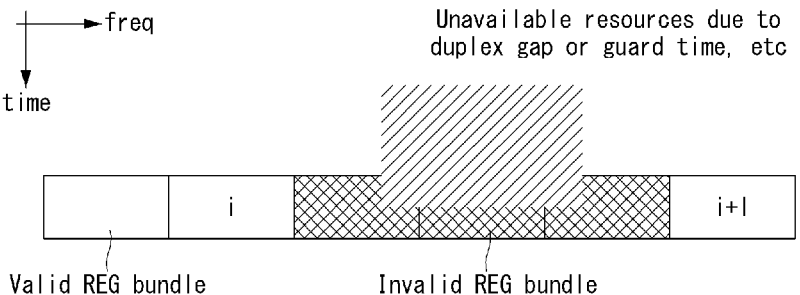
FIG. 11 is a conceptual diagram for describing an example of indexing for REG bundles mapped to valid resources.

Therefore, as shown in FIG. 11 to be described later, it may be preferable that a unit received by the terminal in the valid resource is a REG bundle. CCEs may be configured with only the valid REG bundles, and a mapping method between the REG bundles and the CCEs and a mapping method between the CCEs and PDCCH candidates may follow the conventional method.

Method 2-10: If a part of the CORESET received by the terminal is invalid resources, the terminal may assume that CCEs are mapped only to REG bundles determined as valid.

FIG. 11 is a conceptual diagram for describing an example of indexing for REG bundles mapped to valid resources.

Referring to FIG. 11, the REG bundles may be indexed in an order of low frequency to high frequency. The REG bundle i and the REG bundle i+1 do not have consecutive frequency resources due to unavailable REs. In this case, for the REGs having unavailable REs, an operation for DM-RS reception may be further specified.

Method 2-11: In Method 2-10, when some REs belonging to a REG are invalid, the terminal may assume that a DM-RS is not mapped to the remaining REs belonging to the REG.

The terminal may not receive the DM-RS in the invalid REG. The reason is that since the terminal performs channel estimation in the unit of a REG bundle, a gain of joint channel estimation is reduced when a REG bundle is configured with REGs in which time and/or frequency resources are discontinuously arranged. Therefore, according to Method 2-11, the terminal may not utilize the invalid REG.

Method 2-11 has an advantage of a simplified operation. However, there may be a disadvantage in that a REG excluded from utilization due to including invalid REs is not utilized for the CORESET and is not utilized for the PDSCH. Although DCI mapping to the unused REGs is not preferable for the above reasons, there may be a gain when performing joint channel estimation by mapping only DM-RSs to the unused REGs.

Method 2-12: In Method 2-10, even when some REs belonging to the REG are not valid, the DM-RS may be mapped to the remaining REs belonging to the REG, and the DM-RS may be received by the terminal. In this case, it may be assumed that the same precoding as the adjacent REG bundle is applied to the DM-RS.

Figure 12:
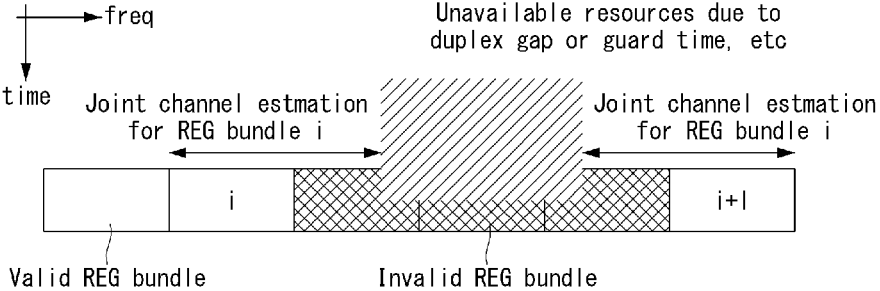
FIG. 12 is a conceptual diagram for describing an example of using a REG having invalid REs.

FIG. 12 is a conceptual diagram for describing an example of using a REG having invalid REs.

Referring to FIG. 12, the DM-RS may be mapped to the REG (i.e., invalid resource) adjacent to the REG bundle i. The terminal may perform joint channel estimation using more DM-RSs for the REG bundle i. Similarly, the terminal may assume that the DM-RS is also mapped to the REG adjacent to the REG bundle i+1. On the other hand, when the DM-RS is used only in the REG belonging to the REG bundle, as shown in FIG. 11, the conventional technical specifications may be used as they are.

Method 2-13: Application of one of Method 2-11 and Method 2-12 may be indicated by RRC signaling to the terminal. Alternatively, without separate signaling, the terminal may perform only one of Method 2-11 and Method 2-12.

A sequence constituting the DM-RS may be generated by using the conventional technical specification as they are. The terminal may assume that the DM-RS sequence is not received at least in RE(s) overlapping the duplex gap and/or guard time. The above methods may be used both when precoderGranularity is indicated as sameAsREG-bundle and when precoderGranularity is indicated as allContiguousRBs.

Figure 13:
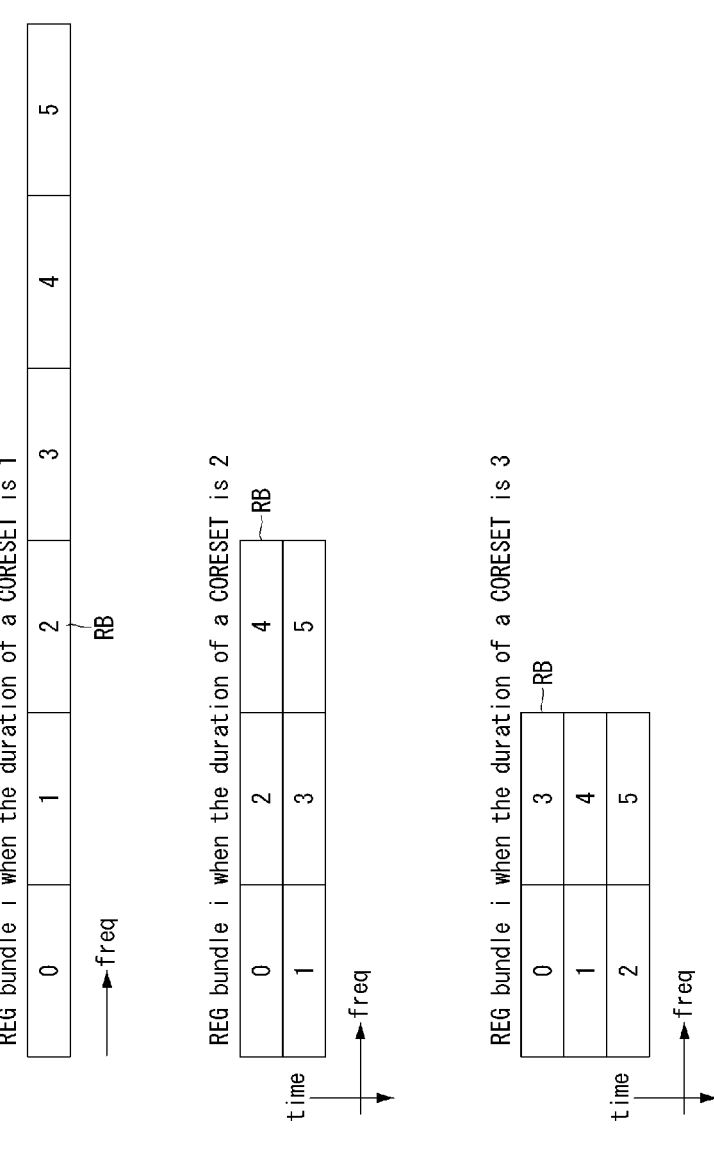
FIG. 13 is a conceptual diagram for describing examples of REGs and REG bundles according to a CORESET duration.

FIG. 13 is a conceptual diagram for describing examples of REGs and REG bundles according to a CORESET duration.

Referring to FIG. 13, the order assigned to REG bundles when the REG bundles constitute one CCE is shown. The REG bundles may be first given indexes according to an order of time (i.e., symbol indexes of the REG bundles), and then may be given indexes according to an order of frequency (i.e., RB indexes of the REG bundles).

A part of REG bundles constituting the same CCE cannot be received due to a duplex direction. According to Methods 2-10 to 2-13, the REG bundle may be reflected in the configuration of the CCE only when it is determined to be valid. Thus, even when REG bundles have contiguous orders, symbols and/or RBs of the REG bundles may not be adjacent to each other.

3 PUSCH Transmission

Upon receiving a scheduling DCI, the terminal should be able to obtain sufficient information to receive a PDSCH or transmit a PUSCH from the received scheduling DCI. When a subband duplex is changed, information on the change of the subband duplex should be able to be indicated to the terminal through the scheduling DCI.

According to the conventional technical specification, signaling indicating PDSCH rate matching to the terminal and signaling indicating PUSCH rate matching to the terminal may be different from each other.

In the case of PDSCH rate matching, several patterns may be configured to the terminal for each BWP through RRC signaling. The configured patterns may occur periodically, and it is assumed that one pattern indicated using a scheduling DCI is actually applied to PDSCH rate matching. One pattern may be expressed by one bitmap or a union of two bitmaps. Each bitmap may represent a different periodicity and a different time/frequency resource. The bitmap may be configured to the terminal by RRC signaling. For example, parameter(s) for configuring the bitmap may be rateMatchPatternGroup or rateMatchPatternGroup1 and rateMatchPatternGroup2.

A resource in which a SS/PBCH block is received may be configured to the terminal by RRC signaling. For example, parameter(s) for configuring the resource may be ssb-PositionInBurst.

When a CORESET is received, a scheme of PDSCH rate matching may vary according to a configuration of precoderGranularity of the CORESET. In the case of the CORESET for which precoderGranularity is set to sameAsREG-bundle, only a PDCCH and PDCCH DM-RS including the scheduling DCI may be utilized in the PDSCH rate matching. In the case of the CORESET for which precoderGranularity is set to allContinuousRBs, the DM-RS mapped to all REGs belonging to the CORESET may be utilized in the PDSCH rate matching.

A zero power (ZP)-CSI-RS or LTE CRS may be used in the PDSCH rate matching. When a PDSCH is allocated by a non-fallback DCI, an aperiodic ZP-CSI-RS may be triggered, which may be utilized in the PDSCH rate matching. On the other hand, when a PDSCH is allocated by a fallback DCI, PDSCH REs may be mapped regardless of the ZP-CSI-RS or LTE CRS.

Rate matching may also be applied to uplink. In order to extend a coverage of a PUSCH, the PUSCH may be repeatedly transmitted. The PUSCH repetition type A or PUSCH repetition type B may be configured to the terminal through RRC signaling. For convenience of description, when the PUSCH repetition type B is indicated, all transmissions of the PUSCH may be expressed as a PUSCH occasion, and each PUSCH repetition may be expressed as a PUSCH instance.

The PUSCH instance may be further classified into a nominal PUSCH instance transmitted in resources allocated by a DCI or RRC signaling and an actual PUSCH instance transmitted only in some of the resources. The actual PUSCH instance may have an independent DM-RS and may have an independent RV.

When transmitting a configured grant PUSCH, the terminal may transmit the PUSCH in resources allocated by a scheduling DCI or RRC signaling. Here, in order to derive a resource capable of transmitting the PUSCH, the terminal may have to consider a separate DCI or RRC signaling for SD symbol(s) in addition to a group common DCI (e.g., DCI format 2_0, format 2_4).

A boundary of actual PUSCH instances may be a slot boundary, a DL symbol, or an FL symbol. This may be derived only by RRC signaling (e.g., numberOfinvalidSymbolsForDL-UL-Switching) or by applying a predetermined pattern that occurs periodically. According to a DCI or RRC signaling for allocating the PUSCH repetition type B, the predetermined pattern may not be applied. For example, the predetermined pattern may be indicated by invalidSymbolPattern of RRC signaling.

As described above, the PUSCH rate matching is applied in units of symbols and is applied only when the PUSCH repetition type B is configured. In other cases, that is, in the case of the PUSCH repetition type A or single transmission, a PUSCH (instance) may be dropped. In order for the PUSCH rate matching to be applied to single transmission of the PUSCH and the PUSCH occasion of the PUSCH, a method of indicating a pattern of invalid symbols or a pattern of a rate matching resource should be introduced. The pattern may be indicated (or configured) to the terminal by a scheduling DCI and/or an activating DCI and/or RRC signaling.

Method 3-1: In PUSCH transmission, a resource to which data is not mapped may be indicated.

An invalid resource in which the terminal cannot perform UL transmission may be indicated to the terminal by RRC signaling and/or DCI. Alternatively, a pattern of a rate matching resource may be indicated to the terminal through a scheduling DCI (or group common DCI), and the terminal may apply the pattern to rate matching. A scheduled resource and an invalid resource may overlap in some RE(s). In this case, the terminal may map a UCI and/or TB only to REs where the scheduled resource and the invalid resource do not overlap.

Method 3-2: In Method 3-1, rate matching may be applied to the entire PUSCH instance in units of symbols and units of RBs.

Method 3-3: In Method 3-1, InvalidSymbolPattern may be extended to a subband. For this, a pattern utilized in the PDSCH rate matching may be reused.

According to the conventional technical specification, such the PUSCH (instance) may not be transmitted, or an actual PUSCH instance may be transmitted together with a DM-RS using only symbols that do not belong to the invalid resource.

When the DM-RS cannot be transmitted, the actual PUSCH instance may not be transmitted.

According to the proposed methods (Method 3-2 or Method 3-3), the terminal may exclude resources overlapping the invalid resources in units of RBs. The terminal may map PUSCH data by using the non-excluded resources.

However, it may be preferable that data is mapped using consecutive RBs and symbols among the resources that are not invalid resources. When considering a situation in which one frequency hop of the PUSCH (instance) is divided into two or more consecutive resources by the invalid resource, several methods may be considered as the method of dividing into two or more consecutive resources.

Figure 14:
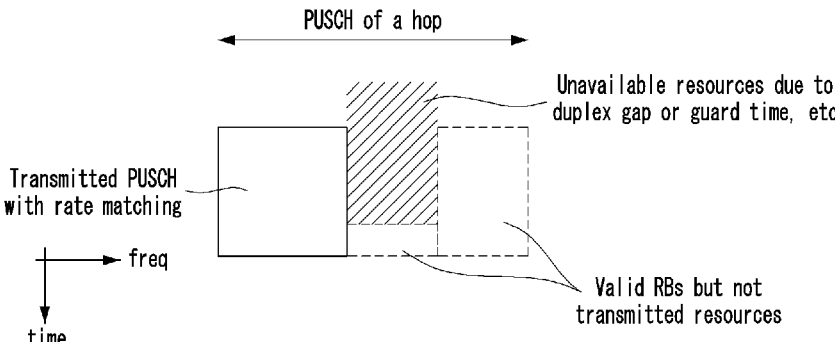
FIG. 14 is a conceptual diagram for describing an example of interpreting the same resource as three consecutive resources.
Figure 15:
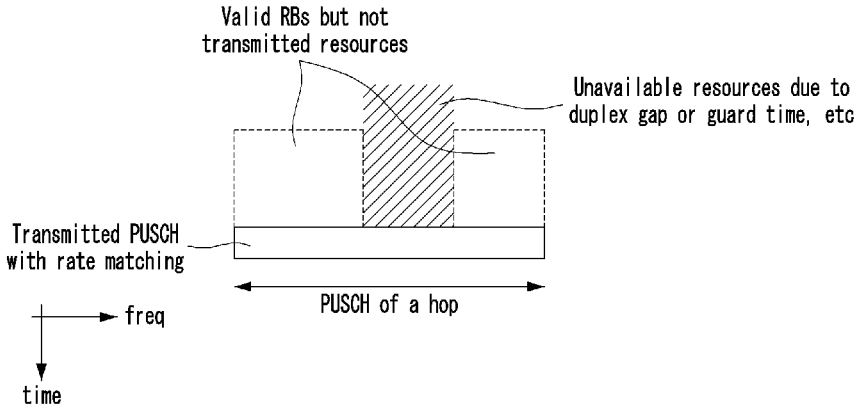
FIG. 15 is a conceptual diagram for describing another example of interpreting the same resource as three consecutive resources.

FIG. 14 is a conceptual diagram for describing an example of interpreting the same resource as three consecutive resources, and FIG. 15 is a conceptual diagram for describing another example of interpreting the same resource as three consecutive resources.

Referring to FIG. 14, from among two or more consecutive resources divided by an invalid resource, the terminal may select a resource having a large region in the time domain. Referring to FIG. 15, from among two or more consecutive resources divided by an invalid resource, the terminal may select a resource having a large region in the frequency domain. In this case, in order to increase a transmission rate, it may be preferable that the terminal selects one resource having a larger number of REs. However, since it is complicated to calculate all of these combinations, the base station may prevent such resources from being generated.

Method 3-4: The terminal may assume that only one consecutive resource is determined from resources other than the invalid resource, otherwise the terminal may not transmit the PUSCH (instance).

In an example, when the terminal performs rate matching, it may be assumed that the terminal performs only symbol-level rate matching or only RB-level rate matching. That is, when the symbol-level rate matching is applied, the PUSCH may be transmitted in a scheduled bandwidth, but may be transmitted only in some consecutive symbols. That is, when the RB-level rate matching is applied, the PUSCH may be transmitted in scheduled symbols, but may be transmitted only in some consecutive RBs.

In general, when allocating a PUSCH (instance), it may have a larger number of symbols or may not have a wider bandwidth than an invalid resource. Therefore, the terminal may not divide one frequency hop of the PUSCH (instance) into non-consecutive resources when excluding the invalid resource. In this case, for one frequency hop of the PUSCH (instance), a resource having a constant bandwidth may be selected from consecutive symbols.

Figure 16:
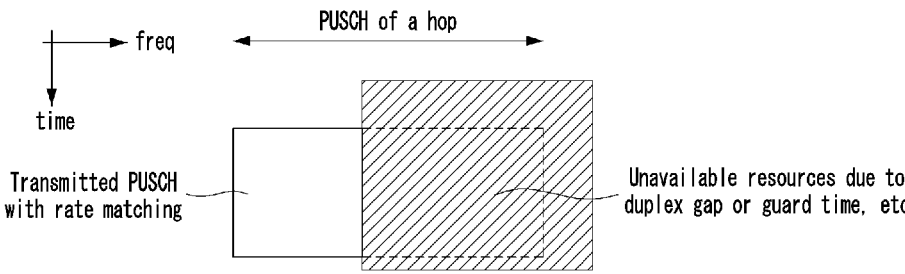
FIG. 16 is a conceptual diagram for describing an example of performing PUSCH rate matching according to an invalid resource.

FIG. 16 is a conceptual diagram for describing an example of performing PUSCH rate matching according to an invalid resource.

Referring to FIG. 16, a bandwidth may be constantly limited irrespective of symbols belonging to one frequency hop of a scheduled PUSCH (instance). In this case, when performing frequency hopping, bandwidths of the respective frequency hops belonging to the same PUSCH (instance) may be different from each other.

Method 3-5: In the case of the PUSCH to which frequency hopping is applied, the number of RBs in the 1st hop and the number of RBs in the 2nd hop may be different from each other due to the invalid resource.

Figure 17:
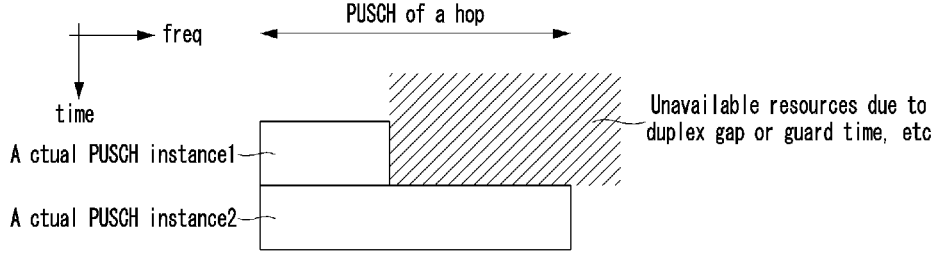
FIG. 17 is a conceptual diagram for describing an example in which an actual PUSCH instance is divided according to an invalid resource.

FIG. 17 is a conceptual diagram for describing an example in which an actual PUSCH instance is divided according to an invalid resource.

Referring to FIG. 17, when a constant bandwidth 1 is applied to some symbol(s) and a constant bandwidth 2 is applied to other symbol(s) in one frequency hop of a scheduled PUSCH (instance), the bandwidth 1 and bandwidth 2 may be different from each other. In this case, since the bandwidths are different, it may be preferable that the base station estimate channels by differently mapping a DM-RS for each bandwidth.

Method 3-6: The PUSCH (instance) allocated to the terminal may be divided into actual PUSCHs (instances) when the bandwidth is changed except for an invalid resource.

In the case of a PUSCH to which frequency hopping is applied, an RB index at which one frequency hop of the PUSCH (instance) starts may be recalculated while being divided into actual PUSCHs (instances). In this case, the example of FIG. 17 may not be applied. This is because the frequency resource of the PUSCH is configured by two RB indexes, the 2nd RB index of the actual PUSCH instance1 may be different from the 1st RB index of the actual PUSCH instance2.

When the terminal performs PUSCH rate matching, a UCI and/or TB may be mapped and a DM-RS may be mapped. To support this, a method for determining the size of the TB, a method for mapping the DM-RS, and a method for determining UCI rate matching are required.

The terminal may not perform PUSCH rate matching. In this case, when the terminal cannot perform UL transmission in a resource in which a PUSCH is scheduled, the terminal may drop the PUSCH. According to the conventional technical specification, a PUSCH may be transmitted in semi-static UL symbol(s), and a configured PUSCH is not allowed to be transmitted in semi-static FL symbol(s), but a dynamic PUSCH may be transmitted in FL symbol(s). That is, when a dynamic SFI is not configured, a PUSCH may be transmitted even in semi-static FL symbol(s), and when a dynamic SFI is configured, a PUSCH may be transmitted in dynamic UL symbol(s).

Method 3-7: When the terminal can distinguish DL/FL/UL for each subband, if UL transmission is allowed in all resources of a PUSCH belonging to SD symbol(s), the PUSCH may be transmitted.

3.1 Method Applying Transform Precoding

A waveform configured for PUSCH transmission may be the CP-OFDM or DFT-s-OFDM. The waveform may be determined according to whether or not transform precoding is additionally applied. For example, when the transform precoding is additionally applied, a DFT-s-OFDM waveform may be generated, and when the transform precoding is not applied, a CP-OFDM waveform may be generated.

A bandwidth for applying the transform precoding may be limited, and the transform precoding may be applied to RBs of multiples of 2, 3, and 5. Therefore, if a PUSCH (instance) is transmitted only in a part of a bandwidth due to an invalid resource, it may be difficult to keep the above-described bandwidth constraint for transform precoding. Therefore, PUSCH rate matching may be applied only when a CP-OFDM waveform is used.

Method 3-8: Rate matching may be performed only for a PUSCH transmitted as a CP-OFDM waveform.

In an example, the terminal may perform rate matching only when a PUSCH is transmitted as a CP-OFDM waveform. In another example, when a PUSCH (instance) is rate matched to have a narrow bandwidth, the PUSCH (instance)

may be limited to have a multiple of 2, 3, and 5 RBs. In this case, the largest number allowed among multiples of 2, 3, and 5 is derived. This may correspond to a bandwidth of a PUSCH to which rate matching is applied.

Method 3-9: In order to perform rate matching for a PUSCH transmitted as a DFT-s-OFDM waveform, the number of RBs that the PUSCH has may be limited to a multiple of 2, 3, and 5.

A method of generating/mapping a DM-RS when a CP-OFDM waveform is used may be different from a method of generating/mapping a DM-RS when a DFT-s-OFDM waveform is used. The terminal may map the DM-RS to each actual PUSCH instance. In the process of performing PUSCH rate matching, a part of a bandwidth may be excluded because it overlaps with an invalid resource. In this case, a DM-RS should be mapped only to a narrower bandwidth than a DM-RS allocated to the terminal.

When a PUSCH waveform is set to a CP-OFDM waveform, a sequence of the DM-RS may be mapped based on the point A. That is, the terminal may generate the DM-RS under the assumption that PUSCH rate matching is not performed, and may map the DM-RS only to RBs to which the PUSCH (instance) is mapped.

When a PUSCH waveform is set to a DFT-s-OFDM waveform, a sequence of the DM-RS may be mapped only to scheduled RBs. That is, the terminal may determine a required length of the DM-RS sequence in consideration of performing PUSCH rate matching, modulate the DM-RS sequence, and map the DM-RS modulation symbol(s) to RE(s).

Accordingly, the length of the DM-RS may be determined by a bandwidth in which the PUSCH is transmitted, and according to Method 3-5, the length of the DM-RS may vary for each frequency hopping.

3.2 Method Determining a TB Size

When rate matching is applied to a PUSCH, a TB size for the PUSCH of single transmission may be determined based on the amount of scheduled resources. Similarly, when the PUSCH repetition type A or PUSCH repetition type B is configured, a TB size may be determined by the amount of scheduled resources.

However, when a PUSCH resource is determined by a scheduling DCI, a rate matching resource (or invalid resource) may be reflected when determining the number of REs allocated to the terminal, and a TB size may be determined based on the number of REs that can actually be used for transmission. In addition, even in the case of a configured grant PUSCH, a TB size may be determined by reflecting a rate matching resource (or invalid resource).

Method 3-10: When the terminal performs repeated PUSCH transmissions, a TB size may be determined by reflecting a rate matching resource.

3.3 Method Determining a Transmission Power

The terminal may determine a transmission power applied to the PUSCH based on the amount of scheduled resources. According to the conventional technical specifications, the transmission power of the PUSCH may be maintained to be identical in all REs of the PUSCH, and may be determined regardless of whether frequency hopping is applied.

Therefore, when a bandwidth is changed by applying rate matching, a method for determining a power applied to one frequency hop of the PUSCH (instance) is required. It may be advantageous for phase continuity that the transmission power is maintained as it is. When the transmission power is changed, a noise may be generated in some OFDM samples for a time required for the change of the transmission power.

Method 3-11: A transmission power of a PUSCH may be determined regardless of PUSCH rate matching.

When a bandwidth of the PUSCH is changed, the transmission power may be changed according to the conventional technical specification. For example, when the number of RBs of the scheduled PUSCH is M, $10 \cdot \log_2 M$ may be reflected in the transmission power. Accordingly, when rate matching is performed and the number of RBs is changed to $M_1 (<M)$, $10 \cdot \log_2 M_1$ may be reflected in an equation for determining the transmission power.

According to Method 3-11, even if the number of RBs is changed, $10 \cdot \log_2 M$ may be reflected when determining the transmission power. Although the first hop and the second hop of the PUSCH may have different bandwidths, their transmission powers may be kept the same. In this case, an EPRE of the first hop and an EPRE of the second hop may be different from each other. Therefore, for each hop of the PUSCH, a received SINR obtained by the base station may be different. In addition, since each hop of the PUSCH may have a bandwidth, the length of the sequence applied to the DM-RS should be different. Therefore, it may be preferable that the DM-RS have different parameters in the first hop and the second hop.

As another configuration parameter for determining the transmission power, the number of REs may be used. According to the conventional technical specifications, it may be possible to configure the transmission power to increase when the number of REs increases. For example, deltaMCS may be enabled. In this case, the number of REs may depend on a result of rate matching. For example, a scheduled PUSCH may include at least a TB, and when the number of REs is N, $10 \cdot \log_2(2^{1.25 \times TBS/N})$ may be reflected in the transmission power. Here, a TB size (TBS) may be the number of REs belonging to the TB. Therefore, when rate matching is performed, if the number of REs is changed to $N_1 (<N)$, $10 \cdot \log_2(2^{1.25 \times TBS/N_1})$ may be reflected in the equation for determining the transmission power.

According to the proposed Method 3-11, even if the number of REs is changed, $10 \cdot \log_2(2^{1.25 \times TBS/N})$ may be reflected when determining the transmission power.

3.4 Method Reporting a Transmission Power Headroom

The result of rate matching may affect not only when determining the transmission power of the PUSCH but also when generating a power headroom report. However, according to Method 3-11, the result of rate matching may not affect the generation of the power headroom report.

When generating a Type1 power headroom report, the terminal may generate the Type1 power headroom report for actual transmission or a reference format.

According to the conventional technical specification, the terminal may report a power headroom to the base station by using a PHR MAC CE. The PHR MAC CE may be a single entry PHR MAC CE or a multiple entry PHR MAC CE according to a MAC subheader. When the multiple entry PHR MAC CE is used, whether a power headroom report is generated for actual transmission or a reference format may be reported to the base station by using one bit.

Method 3-12: When the power headroom for actual transmission is derived, the power headroom in which rate matching is reflected may be derived.

3.5 UCI Rate Matching Method

The terminal may not transmit a PUCCH and a PUSCH at the same time, but may transmit only the PUSCH, but may multiplex a UCI to be included in the PUCCH to the PUSCH. When frequency hopping is applied to the PUSCH, the terminal may perform UCI rate matching and map coded data (i.e., coded TB) to the remaining REs.

A PUSCH to which frequency hopping is applied may be considered. According to the conventional technical specification, hops of the PUSCH may have the same number of REs. Accordingly, rate matching may be performed by considering the number of REs to which the encoded UCI is mapped as a half.

However, when PUSCH rate matching is performed and the first hop and the second hop of the PUSCH have different numbers of REs, the encoded UCI may not be divided in half. For example, when the first hop and the second hop of the PUSCH have $K_1$ REs and $K_2$ REs, respectively, their relative ratios $K_1/(K_1+K_2)$ (hereinafter, $\kappa_1$) and $K_2/(K_1+K_2)$ (hereinafter, $\kappa_2$) may be calculated. Therefore, when determining the amount of the encoded UCI mapped to the first hop of the PUSCH and the amount of the encoded UCI mapped to the second hop of the PUSCH, the ratio may be reflected.

Method 3-13: The amounts G(1) and G(2) in which UCI expressed in G bits are mapped to the PUSCH hops may be determined by $K_1$ and $K_2$.

For example, in the case of a PUSCH with a UL-SCH, $G(1)=N_L \cdot Q_m \cdot \lfloor G/(N_L \cdot Q_m) \cdot \kappa_1 \rfloor$ may be defined, and $G(1)+G(2)=G$ may be established. Here, $N_L$ is the number of transport layers used for transmission, and $Q_m$ may be a modulation rate applied to the PUSCH. For another example, in the case of a PUSCH with a UL-SCH, $G(1)=N_L \cdot Q_{mm} \lceil G/(N_L \cdot Q_m) \cdot \kappa_1 \rceil$ may be defined, and $G(1)+G(2)=G$ may be established. Here, the UCI may be a HARQ-ACK, CSI part1, or CSI part2.

3.6 Method Interpreting an Available Slot Counting

When the PUSCH repetition type A is indicated, the terminal may determine available slots for transmitting the PUSCH. For a repetition factor K indicated to the terminal, since the terminal transmits the PUSCH only in some of K consecutive slots, the number of repetitions actually transmitted may be less than K. Alternatively, the terminal may select slots in which the PUSCH is transmitted so that the number of transmitted repetitions becomes K.

Here, a slot in which the PUSCH repetition is not transmitted may mean a slot in which a DL symbol belonging to a slot format indicated to the terminal through RRC signaling (i.e., tdd-UL-DL-ConfigurationCommon and/or tdd-UL-DL-ConfigurationDedicated) and a scheduled PUSCH overlap and/or a slot in which a SS/PBCH block indicated to the terminal through RRC signaling (i.e., ssb-PositionsInBurst) and a scheduled PUSCH overlap.

According to the conventional technical specification, it is stipulated that valid slots are determined excluding symbols configured to receive a DL signal/channel according to a slot format. Therefore, if a UL signal/channel can be transmitted in a part of a DL (or SD) symbol according to exemplary embodiments of the present disclosure, the above-mentioned criteria should be changed.

Method 3-14: When the terminal transmits a PUSCH (repeatedly), if a UL signal/channel can be transmitted even in a DL (or SD) symbol, the terminal may determine valid slot(s) based on whether the scheduled PUSCH can be transmitted.

Similarly, the same method may be applied to reception of a DL signal/channel.

Method 3-15: When the terminal receives a PDSCH (repeatedly), if a DL signal/channel can be received even in a UL (or SD) symbol, the terminal may determine valid slot(s) based on whether the scheduled PDSCH can be received.

An index of a redundancy version (RV) mapped to a PDSCH repetition or PUSCH repetition may be determined based on the valid slot(s).

4 DL RS Reception

The base station may schedule DL transmission and UL reception in different frequency resources in the same symbol (i.e., subband full duplex). In this case, a cross link interference may occur in the same frequency resource when DL and UL are misaligned between adjacent base stations. In addition, when the terminal performs UL transmission, the UL transmission may act as interference to DL reception of other UEs.

In this case, the terminal may derive the transmission power applied to the same symbol differently from the existing method in order to reduce interference with other terminals. In addition, the base station may allocate the transmission power applied to the same symbol differently from the conventional method.

Method 4-1: When deriving a DL EPRE, a separate power offset may be applied to a symbol (SD symbol) to which subband duplex is applied.

For example, when a transmission power of a SS/PBCH block is configured through RRC signaling, one or more values may be configured to the terminal. Here, one value may be applied to a DL symbol or FL symbol, and another value may be applied to a SD symbol.

For example, when a power applied to CSI-RS transmission is configured by RRC signaling, one or more offsets for the transmission power of the SS/PBCH block may be configured to the terminal. Here, one value may be applied to a DL symbol or FL symbol, and another value may be applied to a SD symbol.

Method 4-2: A SS/PBCH block providing a reference for a transmission power of a CSI-RS received in a SD symbol may be assumed to be transmitted in a DL symbol or FL symbol.

On the other hand, for L1 measurement or L3 measurement derived using the SS/PBCH block and/or CSI-RS, the terminal may distinguish a SD symbol and a non-SD symbol (e.g., DL symbol, FL symbol, or UL symbol). A measurement target symbol may be reported when a measurement result is reported to the base station. The measured value by the measurement may be a received signal reference power (RSRP) and/or signal-to-interference-plus-noise ratio (SINR).

The measurement resource may be composed of a specific symbol and specific subcarriers.

Method 4-3: A set of measurement resources is separately configured to the terminal by RRC signaling, and measurement and reporting may be independently performed for each measurement resource.

For example, a measurement resource 1 and a measurement resource 2 may be configured for the terminal. The measurement resource 1 may be configured as DL/FL symbols, and the measurement resource 2 may be configured as SD symbols. Even when the same DL-RSs (SS/PBCH blocks and/or CSI-RSs) are used, if they belong to different measurement resources, the terminal may not utilize them for L1 filtering or L3 filtering. The reason is that since the transmission power (or EPRE) of the base station may vary for each measurement resource, a received power may also vary for each measurement resource.

The terminal may report a measurement result for the measurement resource 1 and/or a measurement result for the measurement resource 2 to the base station. As an example, the measurement result for the measurement resource 2 may always be reported together with the measurement result for the measurement resource 1.

Method 4-4: When two or more measurement resources are configured to the terminal, with respect to the same DL-RSs, a measurement result for one measurement resource (e.g., measurement resource 2) may always be reported together with a measurement result for another measurement resource (e.g., measurement resource 1).

Method 4-5: In Method 4-4, the measurement result for the measurement resource 2 may be derived as a relative difference value based on the measurement result for the measurement resource 1 and reported to the base station.

When the terminal performs reporting for two or more measurement resources, one measurement resource may become a reference, and only a relative value compared to a measurement result of the measurement resource may be reported to the base station. Accordingly, the number of bits required for reporting may be reduced.

A DL-RS may be received only in some subcarriers belonging to a symbol and frequency resource indicated to the terminal to receive the DL-RS. As an example, according to FIG. 4 described above, subcarriers in which UL transmission is allowed may be located between subcarriers in which DL reception is performed. In this case, the DL-RS may not be received in some subcarrier(s) of a BWP.

Method 4 6: When a DL-RS is not received in a time and frequency resource indicated to the terminal through an RB set, RMR, or SFI, the terminal may receive by puncturing subcarriers belonging to the corresponding frequency resource.

When the terminal receives a CSI-RS, the CSI-RS may be utilized for CSI feedback. Alternatively, the CSI-RS may be utilized for beam management and/or tracking.

In the case of a CSI-RS for tracking (e.g., tracking reference signal (TRS)), if some subcarriers are not received in one TRS symbol, the terminal may not use the same subcarriers in the other TRS symbol. The terminal may preferably use subcarriers received in all symbols of the TRS.

In the case of a CSI feedback, a CSI report (e.g., CQI, PMI, RI, etc.) may be derived from a CSI reference resource. A frequency region and a time region of the CSI reference resource are determined, and a valid DL slot is defined, so that CSI reporting should be performed in or before a slot corresponding to a predetermined time (e.g., nCSI_ref).

The DL-RS may be utilized to estimate a pathloss. When the terminal receives the DL-RS (or a part of the DL-RS) in a SD symbol, the terminal should use only subcarriers capable of DL reception in order to calculate the pathloss. The terminal should be able to correct a transmission power previously indicated by the base station.

5 UL RS Transmission

When the terminal transmits an SRS or PRACH, if UL transmission is not allowed in some resources, the terminal may not transmit a part or all of the SRS or PRACH.

The terminal may be instructed not to use a part of time and/or frequency resources in which the terminal intends to transmit the SRS for UL transmission. For example, this is because the terminal cannot transmit the SRS in resources not indicated as UL or FL in a specific subband.

Hereinafter, cases for a periodic/semi-persistent SRS and an aperiodic SRS will be separately described because transmission scheme thereof are different.

Method 5-1: In the case of a periodic or semi-persistent SRS, the terminal may drop the SRS in a region indicated as DL (or FL in a specific case).

Method 5-2: In the case of an aperiodic SRS, the SRS may not be transmitted in a region indicated as DL (or FL in a specific case), but may be transmitted in the first resource in which SRS transmission is possible.

An aperiodic SRS may be triggered by reception of a DCI format. The terminal may derive resources in which the SRS is transmitted after a predetermined time elapses from a time when transmission of the aperiodic SRS is triggered based on an equation defined in the technical specification. Since the time at which the SRS is transmitted is not explicitly indicated to the terminal, the terminal may select the first transmittable resource from among the resources derived from the equation. Here, the term 'the first' may mean 'the most advanced in time'.

6 PRACH Transmission

The terminal may select a RACH occasion (RO) associated with an SS/PBCH block to perform PRACH transmission for initial access. Here, an RO should be composed of UL symbols. Accordingly, the terminal may derive UL symbols from a common pattern (e.g., tdd-UL-DL-ConfigurationCommon) indicated by SIB1 (or RRC signaling). The terminal may determine an RO not composed of symbols indicated as semi-static UL symbols by the common pattern as an invalid RO.

When the terminal performs contention free random access (CFRA), the terminal may derive a valid RO based on a PDCCH order, and transmit a PRACH in the derived RO. Since the terminal has established an RRC connection, it may be indicated not only with a common slot pattern but also with a dedicated slot pattern (e.g., tdd-UL-DL-ConfigurationDedicated), and may receive a dynamic SFI. Also, the terminal may receive information indicating DL or UL for each subband from the base station.

For example, when the terminal receives a DCI format 1_0, if the received DCI format 1_0 satisfies a specific condition (e.g., when all FDRA fields are configured as 1), the terminal may interpret the DCI as a PDCCH order rather than a scheduling DCI. In this case, the terminal may interpret received information fields of the DCI format for a purpose of the PDCCH order.

The PDCCH order may indicate a random access preamble index, an SS/PBCH block index, and a PRACH mask index, and the terminal may derive one resource by using these. That is, the terminal may derive one or more ROs using the indicated SS/PBCH block index and select one RO using the indicated PRACH mask index. In addition, the terminal may transmit a PRACH in the selected RO using the indicated preamble index.

Method 6-1: The validity of the RO may be determined using only a common slot pattern and/or a dedicated slot pattern. That is, the terminal may use a slot pattern derived only from RRC signaling.

Method 6-2: The terminal derives a pattern of symbols using both a slot pattern derived from RRC signaling and a dynamic SFI, and may determine the validity of the RO in UL symbol(s) (and/or FL symbol(s) and/or SD symbol(s)).

In the above-described methods, the RO may still be derived from resources determined as UL (or FL, SD, or non-DL) in all subbands. When the terminal is in the RRC connected mode, it may be preferable that the RO can be derived from resources determined as UL (and/or FL) only in some subband(s).

Method 6-3: If resources belonging to the RO are determined as UL (and/or FL) even in the SD symbol(s) according to the capability of the terminal, the RO may be regarded as a valid RO.

In order to assign a number to the RO, the terminal may derive valid resources from the SD symbol(s) as well as the semi-static UL symbol(s). If the terminal receives the PDCCH order, when analyzing the PRACH mask, a valid number for RO may be assigned in consideration of the SD symbol(s) and the UL (and/or FL) symbol(s).

7 Priority Between Reception and Transmission

According to the conventional methods, even in a symbol indicated as FL by RRC signaling (i.e., tdd-UL-DL-ConfigurationCommon and/or tdd-UL-DL-ConfigurationDedicated) to the terminal, the terminal may not perform configured transmission (e.g., transmission of a periodic SRS, semi-persistent SRS, and CG PUSCH) and/or configured reception (e.g., reception of a SPS PDSCH, periodic CSI-RS, and semi-persistent CSI-RS).

When DL and UL coexist in a subband, for a case where SD symbols are allocated separately, a case where UL transmission is allowed in some subcarriers of a DL symbol, or conversely, a case where DL reception is allowed in some subcarriers of a UL symbol, the full duplex operation of the terminal may vary.

For example, it may be assumed that a terminal performing an operation in which a duplex varies for each subband performs DL reception and UL transmission in one active BWP, or an activated DL BWP and an activated UL BWP coexist in the same symbol. Alternatively, the terminal may identify whether a resource of a DL signal/channel and/or a resource of a UL signal/channel is valid by receiving an enhanced SFI (i.e., a dynamic signal or channel indicating DL or UL for each subband). Here, the DL signal/channel and/or the UL signal/channel may be scheduled by a DCI format or allocated by RRC signaling.

Figure 18:
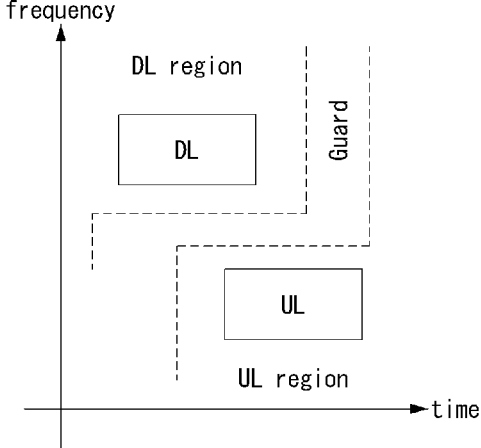
FIG. 18 is a conceptual diagram for describing an example in which a full duplex operation for one terminal is performed in one carrier.

FIG. 18 is a conceptual diagram for describing an example in which a full duplex operation for one terminal is performed in one carrier.

Referring to FIG. 18, the terminal may receive a DL signal/channel and may transmit a UL signal/channel. They may overlap each other in time. The terminal may perform both DL reception and UL transmission, or may perform either DL reception or UL transmission.

According to the conventional methods, even if the terminal supports the full duplex function, since one active BWP is used in one carrier, either one of reception and transmission can be performed. According to a proposed method, the terminal can perform both reception and transmission in one carrier.

Method 7-1: In one carrier, the terminal may perform both reception and transmission in a symbol in which a DL signal/channel and a UL signal/channel overlap.

Method 7-2: The terminal may transmit capability information for the full duplex operation in one carrier to the base station.

The terminal may perform both reception and transmission according to a configuration of the base station.

Figure 19:
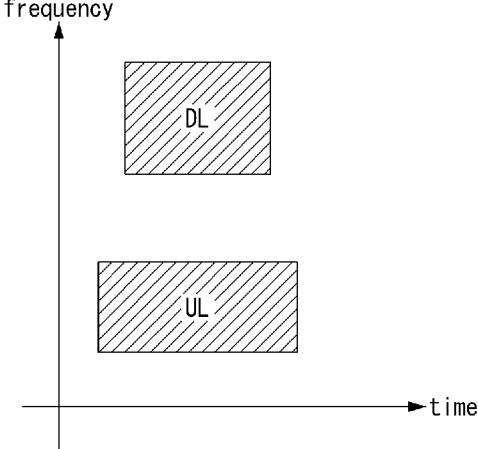
FIG. 19 is another conceptual diagram for describing an example in which a full duplex operation for one terminal is performed in one carrier.

FIG. 19 is another conceptual diagram for describing an example in which a full duplex operation for one terminal is performed in one carrier.

Referring to FIG. 19, the base station may perform scheduling such that a DL signal/channel and a UL signal/channel overlap each other in time. Since the terminal reported the capability for the full duplex operation to the base station, the scheduling may be considered as valid scheduling.

In an example, since the terminal has the full duplex capability, the terminal may perform the reception and transmission regardless of priority indexes (e.g., high priority or low priority) of the DL signal/channel and the UL signal/channel.

When a SPS PDSCH and a CG PUSCH overlap in the same symbol, the terminal may receive the SPS PDSCH and transmit the CG PUSCH according to the capability.

When a PUSCH allocated by a DCI format 0_x and a SPS PDSDCH overlap in the same symbol, the terminal may receive the SPS PDSCH and transmit the PUSCH according to the capability.

When a PDSCH allocated by a DCI format 1_y and a CG PUSCH overlap in the same symbol, the terminal may receive the PDSCH and transmit the CG PUSCH according to the capability.

When a PUSCH allocated by a DCI format 0_x and a PDSCH allocated by a DCI format 1_y overlap in the same symbol, the terminal may receive the PDSCH and transmit the CG PUSCH according to the capability.

In another proposed method, the terminal may only perform either reception or transmission in one carrier.

Method 7-3: Reception or transmission indicated by a DCI format may be performed.

Figure 20:
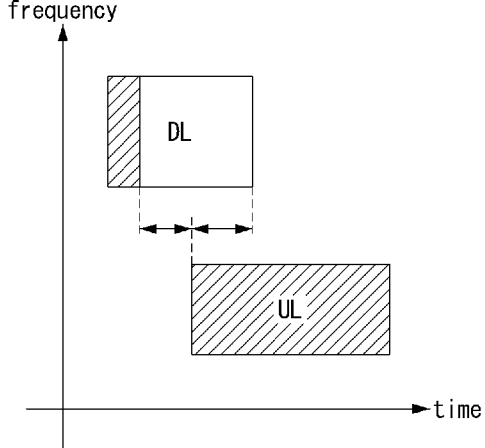
FIG. 20 is a conceptual diagram for describing an example in which one terminal performs only a part of DL reception for UL transmission in one carrier.
Figure 21:
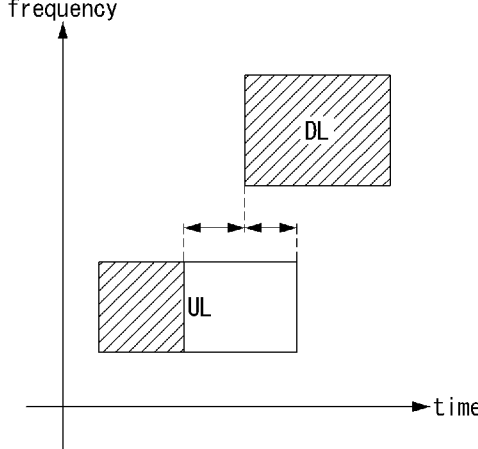
FIG. 21 is a conceptual diagram for describing an example in which one terminal performs only a part of UL transmission for DL reception in one carrier.

FIG. 20 is a conceptual diagram for describing an example in which one terminal performs only a part of DL reception for UL transmission in one carrier, and FIG. 21 is a conceptual diagram for describing an example in which one terminal performs only a part of UL transmission for DL reception in one carrier.

Referring to FIG. 20, when a DCI format 0_x (UL grant) and higher layer signaling (DL grant, e.g., SPS) are considered, the terminal may transmit a UL signal/channel according to the DCI format 0_x. Referring to FIG. 21, when a DCI format 1_y (DL grant) and higher layer signaling (UL grant) are considered, the terminal may receive a DL signal/channel according to the DCI format 1_y.

Here, the unselected DL signal/channel and/or UL signal/channel may be canceled. After a predetermined time elapses from the last symbol of the CORESET including the DCI format received by the terminal, all or part of the DL signal/channel or UL signal/channel to be canceled may be canceled.

Method 7-4: Priority indexes are compared, so that reception or transmission corresponding to a higher priority may be performed.

This means that, unlike Method 7-3, a signal/channel allocated by higher layer signaling may be transmitted. Also, even when a configured DL signal/channel and a configured UL signal/channel overlap each other, one thereof may be selected according to their priority indexes. Here, a signal/channel for which a priority index is not indicated may be interpreted as having a low priority.

Method 7-5: In Method 7-4, when it is interpreted that the DL signal/channel and the UL signal/channel have the same priority index, a signal/channel that temporally first starts to be received or transmitted may be selected.

A DL signal/channel may be repeatedly received or a UL signal/channel may be repeatedly transmitted. In this case, the above methods may be applied for each repetition. In this case, repetition that has not been transmitted may also be counted as transmitted.

When the terminal is configured to select an available slot, the terminal may identify whether a certain slot has a slot format in which a PUSCH can be transmitted and additionally identify whether transmission is possible for each subband. When a PUSCH can be transmitted in the slot format indicated by RRC signaling and/or SFI, the terminal may transmit the PUSCH. In addition, even when PUSCH transmission is not allowed according to the slot format, if the PUSCH can be transmitted according to a duplex pattern according to a subband indicated by RRC signaling and/or enhanced SFI, the terminal may transmit the PUSCH.

8 Method of Generating a HARQ-ACK Codebook

When the terminal is indicated to feedback HARQ-ACKs in the same (sub)slot, or when PUCCHs indicated to the terminal overlap each other in time, the terminal may arrange HARQ-ACK bits in a predetermined order to generate one HARQ codebook.

The HARQ codebook may be classified into several types, and one type may be indicated to the terminal by RRC signaling. In the case of a Type1 HARQ codebook, Type3 HARQ codebook, and enhanced Type3 HARQ codebook, the size of the HARQ codebook may depend on RRC signaling. Therefore, even when a case where the terminal misses a scheduling DCI occurs, the size of the HARQ codebook may not be changed. However, the terminal may have to maintain the size of the HARQ codebook by generating unnecessary HARQ-ACK(s).

Meanwhile, since the Type2 HARQ codebook includes only HARQ-ACK(s) for PDSCH(s) allocated by scheduling DCI(s), the size of the HARQ codebook may vary. To prevent this, an additional information field may be added to the scheduling DCI, which can be used for a purpose of estimating the number of scheduling DCIs.

When the terminal can receive a PDSCH even in SD symbol(s), at least the size of the Type1 HARQ codebook may be affected. The size of the Type1 HARQ codebook may be determined regardless of whether a scheduling DCI is received, but may be affected by reception of a group common DCI (i.e., dynamic SFI). According to a proposed method, whether the terminal can receive a PDSCH in SD symbol(s) may also affect the size of the Type1 HARQ codebook.

When information indicating SD symbol(s) is included in a group common DCI, the terminal may determine the size of the Type1 HARQ codebook by using the information.

In an active DL BWP, a TDRA index and a K1 index may be indicated to the terminal. In a K1 set indicated to the terminal by RRC signaling, one value may be indicated to the terminal as the K1 index. In a TDRA table indicated to the terminal by RRC signaling, any one value may be indicated to the terminal as the TDRA index.

Here, several K1 sets may be indicated to the terminal by RRC signaling, and the terminal may derive one K1 set as an intersection, union, or difference of the K1 sets. For example, when the terminal can receive a multicast PDSCH, a K1 set for multicast PDSCHs and the existing K1 set for unicast PDSCHs may be separately configured for the terminal. In this case, depending on a mode in which the terminal operates, one K1 set may be derived as an union, difference, or intersection thereof.

According to the conventional technical specification, the terminal may not include a HARQ-ACK for a PDSCH candidate expected to have been received before switching of an active DL BWP or switching of an active UL BWP of a serving cell to which a PUCCH is to be transmitted in the HARQ codebook.

When a part of SD symbol(s) is interpreted as DL/FL/UL, a case in which a bandwidth of a DL subband and/or a UL subband is changed according to an indication of the base station may be additionally considered. When this is interpreted as a BWP switching, according to the conventional technical specification, a HARQ-ACK for a PDSCH candidate may not be included in the HARQ codebook. In a proposed method, the validity of the PDSCH candidate may not be interpreted according to BWP switching. That is, even if the bandwidth interpretation of the SD symbol is changed, a HARQ-ACK for a previously received PDSCH candidate may be included in the HARQ codebook.

Method 8-1: When a part of SD symbol(s) is interpreted as DL/FL/UL and a bandwidth of a DL/FL/UL subband is changed, a HARQ-ACK for a previously generated PDSCH candidate may be included in the HARQ codebook.

The terminal may determine a method of determining a case where a PDSCH (or one of PDSCH repetition(s)) derived based on a TDRA is valid in consideration of SD symbol(s).

According to the conventional technical specification, when repeated PDSCH transmission is indicated to the terminal, the terminal may expect to receive PDSCH repetitions in consecutive slots. However, if symbols configured as UL by RRC signaling (i.e., tdd-UL-DL-ConfigurationCommon and/or tdd-UL-DL-ConfigurationDedicated) exist among symbols belonging to the PDSCH repetition(s), the terminal may not include HARQ-ACKs for PDSCH repetitions derived from the corresponding TDRA in the HARQ codebook.

If a scenario in which a part of SD symbol(s) can be interpreted as DL/FL/UL is considered, it may not be preferable to determine the validity of PDSCH repetition in units of symbol(s) as in the conventional technical specification. In a proposed method, the validity of PDSCH repetition may be determined in units of RE.

Method 8-2: When a part of SD symbol(s) can be interpreted as DL/FL/UL and DL reception is allowed in all REs belonging to the PDSCH (repetitions), HARQ-ACKs for PDSCHs (repetitions) derived from the corresponding TDRA may be included in the HARQ codebook.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A subband full duplex operation method of a terminal in a time division duplex (TDD) system, comprising:
   receiving, from a base station, slot pattern information for a slot;
   receiving, from the base station, information on at least one subband; and
   performing uplink transmission and/or downlink reception with the base station in the at least one subband included in at least one subband full duplex (SBFD) symbol included in the slot,
   wherein the at least one subband includes a first subband and a second subband, the terminal performs downlink (DL) reception in the first subband and performs uplink (UL) transmission in the second subband, and the first subband is different from the second subband,
   wherein the information on the at least one subband includes information on a resource block (RB) set corresponding to each of the at least one subband, the RB set is indicated by a starting RB index and a number of RBs constituting the RB set, and a pair of the starting RB index and the number of RBs constituting the RB set is configured for each subcarrier spacing (SCS), and
   wherein a size of a transport block (TB) for the uplink transmission is determined based on scheduled resources within the second subband, which are indicated by scheduling information.

2. The subband full duplex operation method according to claim 1, wherein the slot pattern information is received by radio resource control (RRC) signaling or a combination of RRC signaling and downlink control information (DCI).

3. The subband full duplex operation method according to claim 1, wherein the at least one SBFD symbol is consecutive flexible (FL) symbols located between a downlink (DL) symbol and an uplink (UL) symbol within the slot.

4. The subband full duplex operation method according to claim 1, wherein the at least one SBFD symbol is configured, as consecutive symbols located between a DL symbol and a UL symbol within the slot, as (at least one DL symbol and at least one FL symbol) or (at least one FL symbol and at least one UL symbol).

5. The subband full duplex operation method according to claim 1, wherein the information on the at least one subband is received through at least one of a group common DCI, UE-specific DCI, RRC signaling, or combinations thereof.

6. The subband full duplex operation method according to claim 1, wherein the information on the at least one subband is limitedly applied to the at least one SBFD symbol.

7. The subband full duplex operation method according to claim 1, further comprising receiving, from the base station, information on a first symbol set and a second symbol set of the slot, wherein the first subband is applied to the first symbol set, and the second subband is applied to the second symbol set.

8. The subband full duplex operation method according to claim 1, wherein a guard band exists between the first subband and the second subband.

9. The subband full duplex operation method according to claim 1, wherein the receiving of the information on the at least one subband comprises:
   receiving, from the base station, information on a plurality of subbands through RRC signaling; and
   receiving a media access control (MAC) control element (CE) for activating the at least one subband among the plurality of subbands.

10. A subband full duplex operation method of a base station, comprising:
   transmitting, to a terminal, slot pattern information for a slot;
   transmitting, to the terminal, information on at least one subband; and
   performing uplink reception and/or downlink transmission with the terminal in the at least one subband included in at least one subband full duplex (SBFD) symbol included in the slot, wherein the at least one subband includes a first subband and a second subband, the base station performs downlink (DL) transmission in the first subband and performs uplink (UL) reception in the second subband, and the first subband is different from the second subband, wherein the information on the at least one subband includes information on a resource block (RB) set corresponding to each of the at least one subband, the RB set is indicated by a starting RB index and a number of RBs constituting the RB set, and a pair of the starting RB index and the number of RBs constituting the RB set is configured for each subcarrier spacing (SCS), and wherein a size of a transport block (TB) for the uplink transmission is determined based on scheduled resources within the second subband, which are indicated by scheduling information.

11. The subband full duplex operation method according to claim 10, wherein the at least one SBFD symbol is consecutive flexible (FL) symbols located between a downlink (DL) symbol and an uplink (UL) symbol within the slot.

12. The subband full duplex operation method according to claim 10, wherein the at least one SBFD symbol is configured, as consecutive symbols located between a DL symbol and a UL symbol within the slot, as (at least one DL symbol and at least one FL symbol) or (at least one FL symbol and at least one UL symbol).

13. The subband full duplex operation method according to claim 10, further comprising transmitting, to the terminal, information on a first symbol set and a second symbol set of the slot, wherein the information on the at least one subband includes information on a first subband and a second subband, the first subband is applied to the first symbol set, and the second subband is applied to the second symbol set.

14. A subband full duplex operation method of a terminal, comprising:

receiving, from a base station, configuration information for a control resource set (CORESET);

determining whether at least part of the CORESET is unavailable; and in response to determining that at least part of the CORESET is unavailable, monitoring downlink control channels in valid resource element group (REG) bundle(s) under assumption that control channel element(s) (CCE(s)) are mapped only to the valid REG bundle(s) belonging to the CORESET, wherein the at least part of the CORESET is resource element(s) (RE(s)) in which a downlink (DL) reception operation of the terminal is impossible due to a duplex gap or guard time according to subband full duplex operations.

15. The subband full duplex operation method according to claim 14, wherein the valid REG bundle(s) is a REG bundle(s) that does not include the RE(s) in which the DL reception operation of the terminal is impossible.

* * * * *